(12) United States Patent
Shaw

(10) Patent No.: US 12,041,179 B2
(45) Date of Patent: Jul. 16, 2024

(54) DIGITAL SIGNATURE TERMINAL AND SECURE COMMUNICATION METHOD

(71) Applicant: SHANGHAI FINANASIA INC., Shanghai (CN)

(72) Inventor: Dongxiao Shaw, Shanghai (CN)

(73) Assignee: SHANGHAI FINANASIA INC., Shanghai (CN)

( * ) Notice: Subject to any disclaimer, the term of this patent is extended or adjusted under 35 U.S.C. 154(b) by 176 days.

(21) Appl. No.: 17/412,653

(22) Filed: Aug. 26, 2021

(65) Prior Publication Data

US 2021/0385093 A1 Dec. 9, 2021

Related U.S. Application Data

(63) Continuation of application No. PCT/CN2019/076182, filed on Feb. 26, 2019.

(51) Int. Cl.
| | |
|---|---|
| *H04L 9/32* | (2006.01) |
| *G06F 3/0488* | (2022.01) |
| *G06F 21/32* | (2013.01) |
| *G06Q 20/34* | (2012.01) |
| *H04L 9/40* | (2022.01) |
| *H04L 67/303* | (2022.01) |
| *H04W 12/06* | (2021.01) |

(52) U.S. Cl.
CPC .......... *H04L 9/3247* (2013.01); *G06F 3/0488* (2013.01); *G06F 21/32* (2013.01); *G06Q 20/34* (2013.01); *H04L 63/0442* (2013.01); *H04L 67/303* (2013.01); *H04W 12/06* (2013.01); *H04L 2209/80* (2013.01)

(58) Field of Classification Search
CPC . H04L 9/3247; H04L 63/0442; H04L 67/303; H04L 2209/80; G06F 3/0488; G06F 21/32; G06Q 20/34; H04W 12/06
See application file for complete search history.

(56) References Cited

U.S. PATENT DOCUMENTS

| | | | | |
|---|---|---|---|---|
| 6,084,965 A | * | 7/2000 | Ahn | H04L 9/3247 713/180 |
| 7,188,362 B2 | * | 3/2007 | Brandys | H04L 9/3247 726/28 |
| 7,305,558 B1 | * | 12/2007 | Miyazaki | H04L 9/3247 713/178 |

(Continued)

*Primary Examiner* — Hosuk Song
(74) *Attorney, Agent, or Firm* — Westbridge IP LLC

(57) ABSTRACT

A digital signature terminal device and a secure communication method are provided. The digital signature terminal includes a first module and a second module. The first module includes a communication component configured to communicate with outside and includes a central unit. The central unit includes a memory configured to store data received by the communication component. The central unit is configured to receive an operation from a user, and is controlled, in response to the operation from the user, to be simultaneously connected to the second module and disconnected from the communication component or to be simultaneously disconnected from the second module and connected to the communication component. The second module includes a signature component configured to generate a digital signature for the data, and the second module is configured to send the digital signature to the memory.

23 Claims, 14 Drawing Sheets

(56) References Cited

U.S. PATENT DOCUMENTS

| | | | | |
|---|---|---|---|---|
| 7,363,495 B2 * | 4/2008 | Felt | ............... | H04L 63/0428 |
| | | | | 713/170 |
| 7,539,730 B2 * | 5/2009 | Adams | ............... | H04L 63/20 |
| | | | | 709/219 |
| 7,610,632 B2 * | 10/2009 | Higuchi | ............... | H04L 9/3247 |
| | | | | 713/168 |
| 7,660,989 B2 * | 2/2010 | Tomkow | ............... | H04L 51/08 |
| | | | | 713/176 |
| 8,447,980 B2 * | 5/2013 | Godfrey | ............... | H04L 67/565 |
| | | | | 713/170 |
| 11,689,355 B2 * | 6/2023 | Davis | ............... | G06Q 20/3825 |
| | | | | 380/28 |

* cited by examiner

DIGITAL SIGNATURE TERMINAL AND SECURE COMMUNICATION METHOD

CROSS-REFERENCE TO RELATED APPLICATIONS

This application is a continuation application of International Application No. PCT/CN2019/076182, titled "DIGITAL SIGNATURE TERMINAL AND SECURE COMMUNICATION METHOD", filed on Feb. 26, 2019, which is incorporated herein by reference in its entirety.

TECHNICAL FIELD

The present disclosure relates to a digital signature terminal device and a secure communication method.

BACKGROUND

With the rapid development of E-commerce and information security technology, digital signatures, because of their properties of uniqueness, non-repudiation, and security, have been widely used as legal basis for parties in paperless transactions to confirm transactions. However, computer terminals form an insecure computing environment due to their software and hardware deficiencies. There are many security risks when using the computer terminals to calculate digital signatures, such as the insecure storage and insecure carrying of the signature private keys, and the leakage of the private key during signature calculations, which may result in undesired digital signatures.

Since the computer terminal cannot guarantee the secure calculation of digital signatures, auxiliary devices are required to provide assistances. USB keys and smart cards are currently the most popular auxiliary devices for computing digital signatures. The hardware structures, interface functions and operating systems of the USB key and smart cards are simple and dedicated, and thus are much easier to be tested than software for computer terminals. Therefore, the USB keys and smart cards can help to guarantee the security of key storage and data operations.

In recent years, more and more mobile devices have been developed, but most mobile devices do not have USB interfaces, which makes it difficult to use a USB key to assist the digital signature operation.

Therefore, it is desirable to provide a portable device and a method for the secure use of digital signatures of data.

SUMMARY

A brief overview of the present invention is given below in order to provide a basic understanding of some aspects of the present invention. This summary is not an exhaustive summary of the present invention, and it is neither intended to indicate the essential or important part of the present invention, nor intended to limit the scope of the present invention. It is provided only to give some concepts in a simplified form, as a foreshadowing of the following specific embodiments.

In view of the above problem, a terminal used for digital signature is provided in the present disclosure, including a first module and a second module. The first module includes a communication component configured to communicate with outside and includes a central unit. The central unit includes a memory configured to store data received by the communication component. The central unit is configured to receive instructions from a user to be simultaneously connected to the second module and disconnected from the communication component or to be simultaneously disconnected from the second module and connected to the communication component. The second module includes a signature component configured to generate a digital signature for the data, and the second module is configured to send the digital signature to the memory.

In another aspect of the present disclosure, a method for secure communication is provided. The method includes: i) receiving a message and storing the message into a memory; ii) reading the message from the memory and generating a digital signature for the message; iii) storing the digital signature into the memory; iv) acquiring the digital signature and the message from the memory and sending the message attached with the digital signature. No message from the memory can be operated in second module while receiving and storing message in first module.

In yet another aspect of the present disclosure, a payment card including the digital signature according to any embodiment in the present disclosure is provided. The communication component is configured to receive a message carrying billing information and store the message into the memory, and is configured to receive an instruction from a user, after the payment message is displayed on the device. The signature component is configured to generate the digital signature for the message, and send the digital signature to the memory. The communication component is configured to send the stored message attached with the digital signature to perform payment.

In yet another aspect of the present disclosure, a public transportation card including the digital signature according to any embodiment in the present disclosure is provided. The communication component is configured to send an instruction from a user via an LPWAN network, after the user reviewed a menu displayed on the device. The signature component is configured to acquire a preset message from the memory of the first module, and to generate the digital signature for the message, and send the digital signature to the memory. The communication component is then sent the stored message attached with the digital signature to a server via the LPWAN network. The communication component is configured to communicate money-recharging message to the server via the LPWAN network to recharge the public transportation card.

In yet another aspect of the present disclosure, a computer readable storage medium is provided, which stores a program. The program is used to, when being executed by a user, perform the following steps: i) receiving a message then displaying and storing the message into a memory; ii) after user's approval, reading the message from the memory and generating a digital signature of the message; iii) storing the digital signature into the memory; iv) acquiring the digital signature and the message from the memory and sending the message attached with the digital signature. No message can be read from the memory while receiving and storing the message.

In yet another aspect of the present disclosure, a program is provided. The program includes machine-executable instruction which when being executed by an information processing system, cause the information processing system to perform the above method according to the present disclosure.

In summary, according to the embodiments of the present invention, the following technical solutions are provided.

A terminal used for digital signature includes:
a first module, and
a second module, wherein the first module includes a communication component configured to communicate with outside, the first module further includes a memory configured to store data received by the communication component, the first module is configured to receive an operation from a user, and is controlled, in response to the operation from the user, to be connected to or disconnected from the second module, the second module includes a signature component configured to generate a digital signature for the data, and the second module is configured to send the digital signature to the memory.

Optionally, the communication component is configured to send the data attached with the digital signature to the outside.

Optionally, the first module includes a physical switch, and the operation from the user is performed via the physical switch.

Optionally, the first module includes an identification component configured to perform identification on the user.

Optionally, the first module is configured to permit or prohibit receiving the operation from the user according to a result of the identification.

Optionally, the identification component is configured to perform the identification on the user by means of a password or a biometric feature of the user.

Optionally, a password or a biometric feature stored in the identification component is set or reset after being subjected to multiple security checks by an application program run on the terminal.

Optionally, one of the first module and the second module includes a display screen, the display screen is configured to display the stored data for a check by the user, wherein the user instructs, according to a result of the check, the signature component to generate the digital signature.

Optionally, the user instructs the terminal to end processing in a case that the result of the check is negative, and instructs the signature component to generate the digital signature if the result of the check is positive.

Optionally, the display screen is a touch screen, the user instructs the terminal to end processing by touching a button which is on the touch screen and is used for ending the processing, and the user instructs the signature component to generate the digital signature by touching a button which is on the touch screen and is used for generating the digital signature.

Optionally, the user instructs the terminal to end processing by operating a physical button which is arranged on one of the first module and the second module and used for ending the processing, and the user instructs the signature component to generate the digital signature by operating a physical button which is arranged on one of the first module and the second module and used for generating the digital signature.

Optionally, the user instructs the terminal to end processing by performing no operation in a predetermined time period.

Optionally, one of the first module and the second module includes an encryption component, wherein the encryption component is configured to encrypt the data attached with the digital signature, and the communication component is configured to send the encrypted data attached with the digital signature to the outside; or the encryption component is configured to encrypt the stored data, and the signature component is configured to generate the digital signature for the encrypted data.

Optionally, the first module further includes a verification component configured to perform verification on data attached with a first digital signature, wherein the data attached with the first digital signature is received by the communication component, and processing is terminated if the verification is unsuccessful.

Optionally, the first digital signature for the data is generated by a cloud server using a cloud signature private key, and the terminal is configured to perform the verification using a terminal signature public key.

Optionally, the second module further includes a decryption component configured to perform decryption on encrypted data received by the communication component, and processing is terminated if the decryption is unsuccessful.

Optionally, the encrypted data is generated by the cloud server using a terminal encryption public key, and is decrypted by the terminal using a terminal decryption private key.

Optionally, the verification component is configured to verify encrypted data attached with a second digital signature, and the decryption component is configured to decrypt the verified encrypted data, wherein the encrypted data attached with the second digital signature is received from the communication component; or the decryption component is configured to decrypt encrypted information including data attached with a first digital signature, and the verification component is configured to verify the decrypted information including the data attached with the first digital signature.

Optionally, the first module further includes a control component configured to control components of the first module.

Optionally, the first module includes:

the communication component configured to communicate with outside; and a central unit including the memory configured to store data received by the communication component, and the central unit is configured to receive the operation from the user and is controlled, in response to the operation from the user, to be simultaneously connected to the second module and disconnected from the communication component or to be simultaneously disconnected from the second module and connected to the communication component.

Optionally, the physical switch, the identification component, the verification component, and the control component are arranged in the central unit.

Optionally, the display screen and the encryption component are arranged in one of the central unit and the second module.

Optionally, the central unit is configured to receive an operation from a user, and is controlled, in response to the operation from the user, to be simultaneously connected to the second module and disconnected from the communication component.

Optionally, the central unit is configured to receive an operation from a user after the second module completes operation, and is controlled, in response to the operation from the user, to be simultaneously disconnected from the second module and connected to the communication component.

Optionally, the first module includes:

the communication component configured to communicate with outside; and a base unit including a memory configured to store data received by the communication component and a power supply configured to supply power to the terminal, wherein the base unit is configured to receive an operation from a user and is controlled, in response to the operation from the user, to be selectively connected to the communication component or a central unit; and a central unit, including an identification component, and is configured to receive an operation from a user to be controlled, in response to the operation from the user, to be connected to or disconnected from the second module.

Optionally, after the data from the communication component is stored in the memory, the base unit is simultaneously disconnected from the communication component and connected to the central unit.

Optionally, the central unit is configured to prohibit or permit, based on an identification result from the identification component, the central unit receiving an operation from a user.

Optionally, after the second module completes operations, the central unit is disconnected from the second module, then the base unit is simultaneously disconnected from the central unit and connected to the communication component.

Optionally, the first module further includes a power supply for supplying power to the terminal.

Optionally, the first module is configured to communicates with the outside via an LPWAN network.

Optionally, a firmware of the second module is unchangeable after leaving factory.

Optionally, the communication component adopts one of:
remote wireless communication;
short-range wireless communication; and
wired communication.

A method for secure communication includes the following steps:
i) receiving a message and storing the message into a memory;
ii) reading the message from the memory and generating a digital signature for the message;
iii) storing the digital signature into the memory;
iv) acquiring the digital signature and the message from the memory and sending the message attached with the digital signature;
wherein no message can be read from the memory while receiving and storing the message.

Optionally, step ii) includes:
ii-a) performing identification on a user;
ii-b) reading the message from the memory and generating the digital signature for the message in a case that the identification is successful; and
ii-c) ending the method in a case that the identification is unsuccessful.

Optionally, step ii-b) includes:
ii-b-1) reading the message from the memory and displaying the message for a check by the user, in a case that the identification is successful;
ii-b-2) generating the digital signature for the message in a case that the check is successful; and
ii-b-3) ending the method in a case that the check is unsuccessful.

Optionally, step i) includes receiving a first message attached with a first digital signature m1, and storing the first message attached with the first digital signature m1 into the memory, wherein the first digital signature m1 for the first message is generated by using a first signature private key; step ii) includes reading the first message attached with the first digital signature m1 from the memory, verifying the first message attached with the first digital signature m1 by using a first signature public key, and generating the digital signature for the verified first message by using a second signature private key; step iii) includes storing the digital signature into the memory; and step iv) includes sending the first message attached with the digital signature.

Optionally, step i) includes receiving a ciphertext and storing the ciphertext into the memory, wherein the ciphertext is generated by encrypting the first message attached with the first digital signature m1 using a third encryption public key.

Optionally, step ii) includes:
reading the ciphertext from the memory;
decrypting the ciphertext by using a third decryption private key to obtain the decrypted first message attached with the first digital signature m1; and
verifying the first message attached with the first digital signature m1 by using the first signature public key.

Optionally, step i) includes receiving a ciphertext attached with a digital signature k, and storing the ciphertext attached with the digital signature k into the memory, wherein the ciphertext is generated by encrypting the first message using a third encryption public key, the digital signature k for the ciphertext is generated by using the first signature private key.

Optionally, step ii) includes:
reading the ciphertext attached with the digital signature k from the memory;
verifying the ciphertext attached with the digital signature k by using the first signature public key;
decrypting the verified ciphertext by using a third decryption private key to obtain the first message; and
generating the digital signature for the decrypted first message by using a second signature private key.

Optionally, step ii) further includes encrypting the first message attached with the digital signature by using a fourth encryption public key to obtain a ciphertext; step iii) includes storing the ciphertext into the memory; and step iv) includes sending the ciphertext.

Optionally, step ii) includes reading the message from the memory, generating a hash value for the message, and generating a digital signature for the hash value; step iii) includes storing the hash value attached with the digital signature into the memory; and step iv) includes acquiring the hash value attached with the digital signature from the memory and sending the hash value attached with the digital signature.

Optionally, an algorithm used for generating the digital signature, the first digital signature or the second digital signature is different from an algorithm used for the encryption or decryption.

Optionally, the pair of the first signature public key and the first signature private key, the pair of the second signature public key and the second signature private key, the pair of the third encryption public key and the third decryption private key, and the pair of the fourth encryption public key and the fourth decryption private key are different from each other; or the pair of the first signature public key and the first signature private key is the same as the pair of the fourth encryption public key and the fourth decryption private key, and the pair of the third encryption public key and the third decryption private key is the same as the pair of the second signature public key and the second signature private key.

Optionally, a symmetric algorithm is used for encryption and decryption.

A financial card includes the terminal described above, wherein the communication component is configured to:

receive a message carrying financial data and store the message into the memory;

receive the operation from the user, so that in response to the operation from the user, the first module is connected to the second module;

the signature component is configured to generate the digital signature for the message, and send the digital signature to the memory; and the communication component is configured to send the stored message attached with the digital signature to perform payment.

Optionally, the financial data includes information related to payment for an online order, the information includes a total amount for the online order, payee information, a timestamp, and payer information.

Optionally, the financial data includes information related to money transfer, the information includes transfer amount, transfer-in account information, transfer-out account information, and a timestamp.

Optionally, the communication component adopts short-range wireless communication and is configured to send a money-withdrawal instruction in response to an instruction from a user, and then receive the message carrying the financial data, and the financial data includes information related to verification for money-withdrawal, the information includes a withdrawal amount, a withdrawal location, withdrawal account information, and a timestamp.

An offline quick-payment card includes the terminal described above, wherein the first module is configured to receive the operation from the user, so that, in response to the operation from the user, the first module is connected to the second module, the signature component is configured to acquire a preset message from the memory of the first module, generate the digital signature for the message, and send the digital signature to the memory;

the communication component is configured to send the stored message attached with the digital signature to a server via a LPWAN network; and the communication component is configured to receive information carrying money-recharging data from the server via the LPWAN network to recharge the offline quick-payment card.

A computer readable storage medium stores a program, wherein the program is used to, when being executed by a processor, perform the following steps:

i) receiving a message and storing the message into a memory;

ii) reading the message from the memory and generating a digital signature for the message;

iii) storing the digital signature into the memory;

iv) acquiring the digital signature and the message from the memory and sending the message attached with the digital signature;

wherein no message can be read from the memory while receiving and storing the message, and no received message can be stored into the memory while reading the message from the memory, and wherein no message can be read from the memory while receiving and storing the message.

With the terminal and the method according to the present disclosure, digital signature can be performed with a high security.

These and other advantages of the present disclosure will be more apparent by illustrating in detail preferred embodiments of the present disclosure with reference to accompanying drawings below.

BRIEF DESCRIPTION OF THE DRAWINGS

Features and advantages of the present invention can be better understood from the embodiments illustrated with reference to the drawings. The drawings are provided only for the purpose of schematically illustrating some embodiments of the present invention, rather than all possible implementations, and the drawings are not intended to limit the scope of the invention. In the drawings.

DETAILED DESCRIPTION OF EMBODIMENTS

Figure 1:
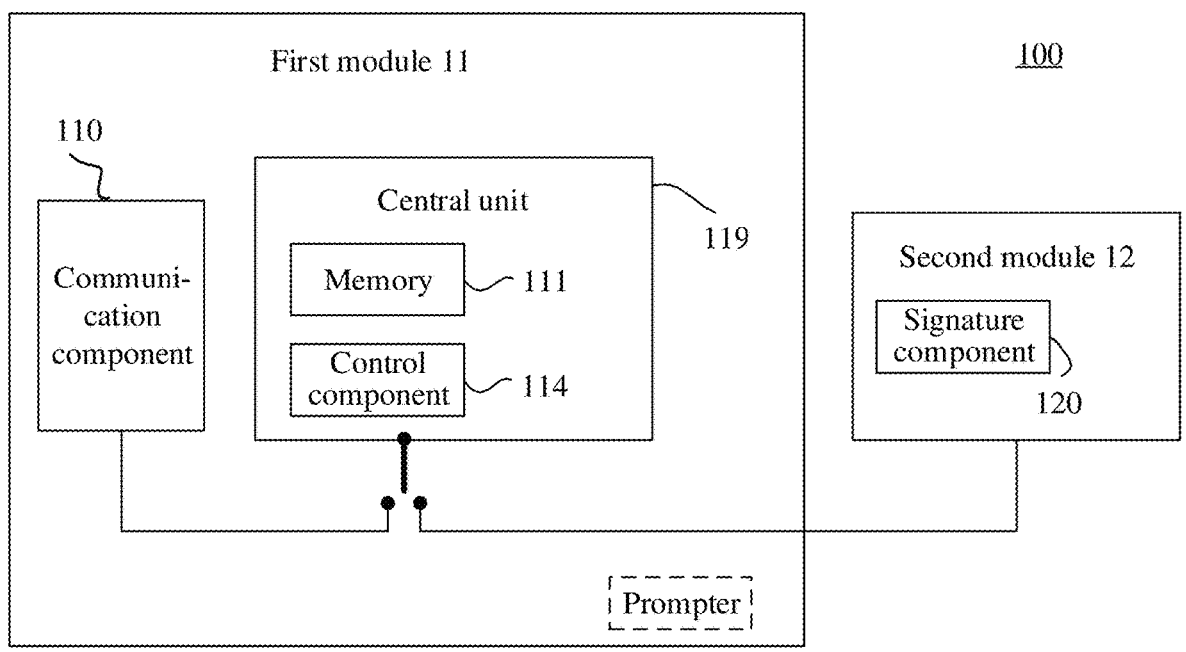
FIG. 1 is a schematic structural diagram of a first example of a digital signature terminal according to a first embodiment in the present disclosure.

The embodiments of the present invention are described in detail with reference to the drawings. It should be noted that the following description is only exemplary, and is not intended to limit the present invention. In the following description, the same reference numerals will be used to denote the same or similar components in different drawings. Different features in the different embodiments described below can be combined with each other to form other embodiments within the scope of the present invention.

First Terminal Embodiment

Example 1

FIG. 1 shows a first example of a digital signature terminal according to a first embodiment in the present disclosure. As shown in FIG. 1, the digital signature terminal 100 includes a first module 11 and a second module 12.

The first module 11 includes a communication component 110 configured to communicate with outside. The first module 11 further includes a central unit 119. The central unit 119 includes a memory 111 configured to store data sent by the communication component 110, and a control component 114 configured to control components of the central unit 119. The central unit 119 is configured to receive an operation from a user to be simultaneously connected to the second module 12 and disconnected from the communication component 110 or to be simultaneously disconnected from the second module 12 and connected to the communication component 110.

The second module 12 includes a signature component 120 configured to generate a digital signature for the data. The signature component 120 generates the digital signature by using a terminal signature private key. Preferably, the second module 12 includes a first security element for storing the terminal signature private key. In addition, the second module 12 sends the digital signature to the memory 111 for transmission by the communication component 110.

The second module 12 may be fixed to the first module 11, and may be connected to the first module 11 via a physical switch such as a button or a press-key. When a signature is needed, a user may switch on the physical switch to sign. In this case, as shown in FIG. 1, a single-pole-double-throw switch may be preferable used to control the central unit 119 to be simultaneously connected to the second module 12 and disconnected from the communication component 110, or to be simultaneously disconnected from the second module 12 and connected to the communication component 110.

Alternatively, the second module 12 may be a detachable device, which may be carried by the user and may be inserted into the first module 11 by the user when a signature is needed. In this case, a switching device may be arranged between the communication component 110 and the central unit 119. When the second module 12 is inserted into the first module 11, the first module 11 turns off the switching device to disconnect the communication component 110 from the central unit 119. When the second module 12 is pulled out of the first module 11, the first module 11 turns on the switching device to connect the communication component 110 with the central unit 119.

The firmware in the first module 11 may be updated by a new version downloaded from the Internet, while the firmware in the second module 12 cannot be changed after leaving the factory.

Preferably, the first module 11 may further include a prompter, such as a voice prompter, an LED indicator or a display screen, so as to prompt, when the communication component 110 stores data in the memory 111, the user to perform an operation to simultaneously connect the central unit 119 to the second module 12 and disconnect the central unit 119 from the communication component 110, and prompt, when the second module 12 stores the digital signature in the memory 111, the user to perform an operation to simultaneously disconnect the central unit 119 from the second module 12 and connect the central unit 119 to the communication component 110.

Preferably, the communication component 110 may adopts one of the following communication manners: 1) remote wireless communication, such as the low-power wide area network (LPWAN) protocol (such as NB IoT, LTE-M, LoRa or Sigfox); 2) short-range wireless communication, such as the low-power Bluetooth (BLE), near field communication (NFC) or WIFI; and 3) wired communication, such as a USB interface, or an iPhone lightning interface.

In use, the digital signature terminal 100 performs the following steps (i) to (vii).

In step (i), the communication component 110 receives data and stores the data in the memory 111.

In step (ii), the first module 11 controls a prompter to present a prompt such as a light, a voice, or a text, to inform the user that the data is received, and prompt the user to perform an operation.

In step (iii), the user performs an operation to simultaneously connect the central unit 119 to the second module 12 and disconnect the central unit 119 from the communication component 110.

In step (iv), the signature component 120 generates a digital signature for the data using a terminal signature private key, and stores the digital signature in the memory 111. Preferably, the signature private key is stored in a first secure element in the second module 12.

In step (v), the first module 11 controls the prompter to present a prompt to prompt the user to perform an operation.

In step (vi), the user performs an operation to simultaneously disconnect the central unit 119 from the second module 12 and connect the central unit 119 with the communication component 110.

In step (vii), the communication component 110 sends the data attached with the digital signature.

The above digital signature terminal 100 performs the digital signature operation without any communication with the outside, leading to high security and reliability.

However, the second module may be maliciously operated by someone other than the owner. In view of this, preferably the digital signature terminal 100 may include an identification component for identifying a user's identity.

Example 2

Figure 2:
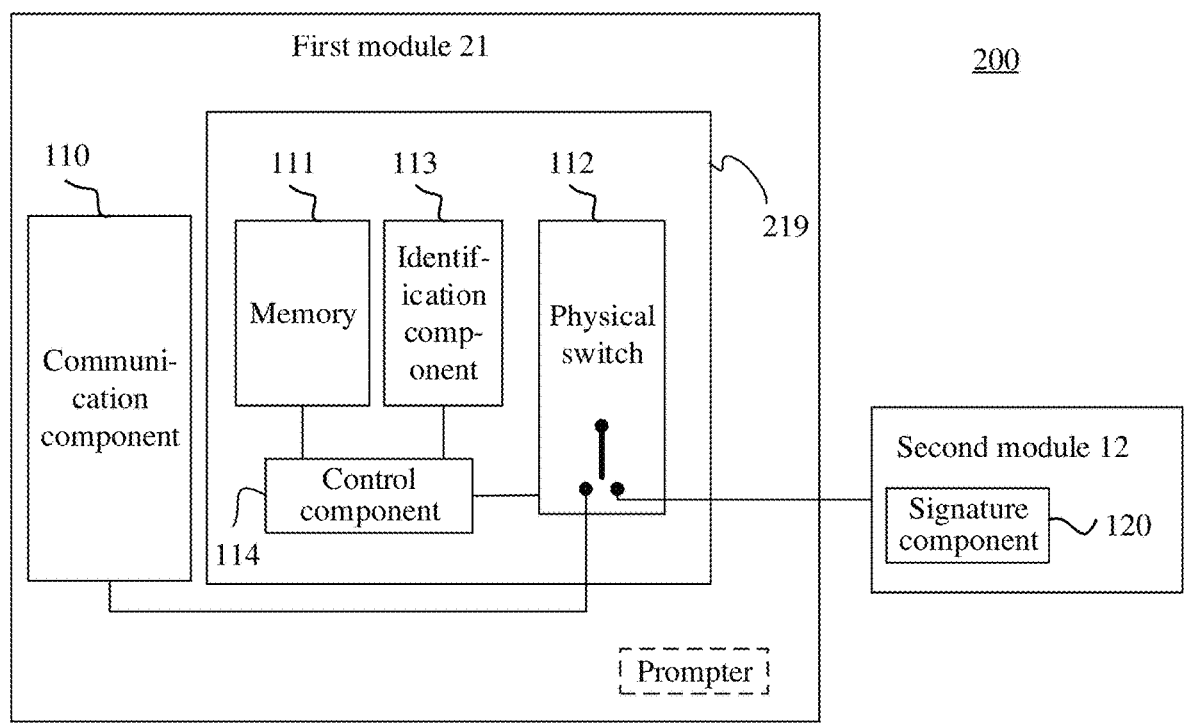
FIG. 2 is a schematic structural diagram of a second example of the digital signature terminal according to the first embodiment in the present disclosure.

FIG. 2 is a schematic structural diagram of a second example of the digital signature terminal according to the first embodiment in the present disclosure. In FIG. 2, the components with the same reference numerals as those in FIG. 1 have the same functions as those in FIG. 1, which will not be repeated here.

As shown in FIG. 2, compared with the first example, the central unit 219 further includes an identification component 113 for performing identification on a user, and a physical switch 112 such as a single-pole-double-throw switch. As described above, the user operates the physical switch 112 to simultaneously connect the central unit 119 to the second module 12 and disconnect the central unit 119 from the communication component 110, or simultaneously disconnect the central unit 119 from the second module 12 and connect the central unit 119 to the communication component 110.

The identification component 113 is used to identify the user. Based on the result of the identification part 113, the control component 114 prohibits or permits the user's operation, such as turning on or turning off the physical switch. The identification component 113 identifies the user's identity through a password or a biometric feature of the user, such as a fingerprint, an iris, a face, a DNA, and the like. Preferably, the identification component 113 has a password reset function.

In addition, in a case that multiple users use the same terminal, the identification component 113 may identify the user's identity through a user name and a password or through a user name and a biometric feature of the user.

Preferably, the password or biometric features stored in the identification component may be set or reset through an application program run on a mobile terminal such as a mobile phone or a laptop computer. The application program performs multiple security checks on the user's identity, permits the user to set or reset the password or the biometric feature if the checks are passed, and prohibits the user from performing the setting or resetting if the checks are not passed.

Preferably, the control component 114 may be configured to terminate the processing if the identification component 113 continuously fails to identify the user for a predetermined number of times.

Preferably, the first module 21 may further include a prompter, such as a voice prompter, an LED indicator or a display screen, to notify the user that data is received by the communication component, or that the second module completes the operation, or show an identification result. For example, when the communication component 110 receives data, the prompter may present a prompt, such as a light, a voice, or a text, to notify the user that the data is received, and prompt the user to perform an operation. When the second module 12 completes the operation, the prompter may present a prompt, such as a light, a voice, or a text, to prompt the user to perform an operation. When the identification component 113 identifies the user successfully, the prompter may present a prompt such as a light, a voice, or a text, to inform the user that the identification is successful and remind the user to turn on the physical switch. When the identification component 113 fails to identity the user, the prompter may present a prompt, such as a light, a voice, or a text, to inform the user that the identification is unsuccessful and remind the user to re-identify.

In the second example, the digital signature terminal 200 performs the following steps (i) to (viii).

In step (i), the communication component 110 receives data and stores the data in the memory 111.

In step (ii), the first module 21 controls a prompter to present a prompt such as a light, a voice, or a text, to inform the user that the data is received, and prompt the user to perform an operation.

In step (iii), the identification component 113 performs identification on the user, and the prompter presents the identification result. If the identification is unsuccessful, the user is notified that the identification is unsuccessful and is reminded to perform the identification again. If the number of unsuccessful identifications reaches a predetermined number of times, the processing is terminated. If the identification is successful, the user is notified that the identification is successful and is reminded to turn on the physical switch 112.

In step (iv), in a case that the user is identified successfully, the user operates the physical switch 112 to simultaneously connect the central unit 219 to the second module 12 and disconnect the central unit 219 from the communication component 110.

In step (v), the signature component 120 generates a digital signature for the data, and stores the digital signature in the memory 111.

In step (vi), the first module 21 controls the prompter to present a prompt to prompt the user to perform an operation.

In step (vii), the user operates the physical switch 112 to simultaneously disconnect the central unit 219 from the second module 12 and connect the central unit 219 to the communication component 110.

In step (viii), the communication component 110 sends the data attached with the digital signature.

In some cases, the data received by the first module is not consistent with the data that the user intends to sign, due to an error at the sending side. In view of this, preferably, the digital signature terminal 200 may further include a display screen for checking data.

Example 3

Figure 3:
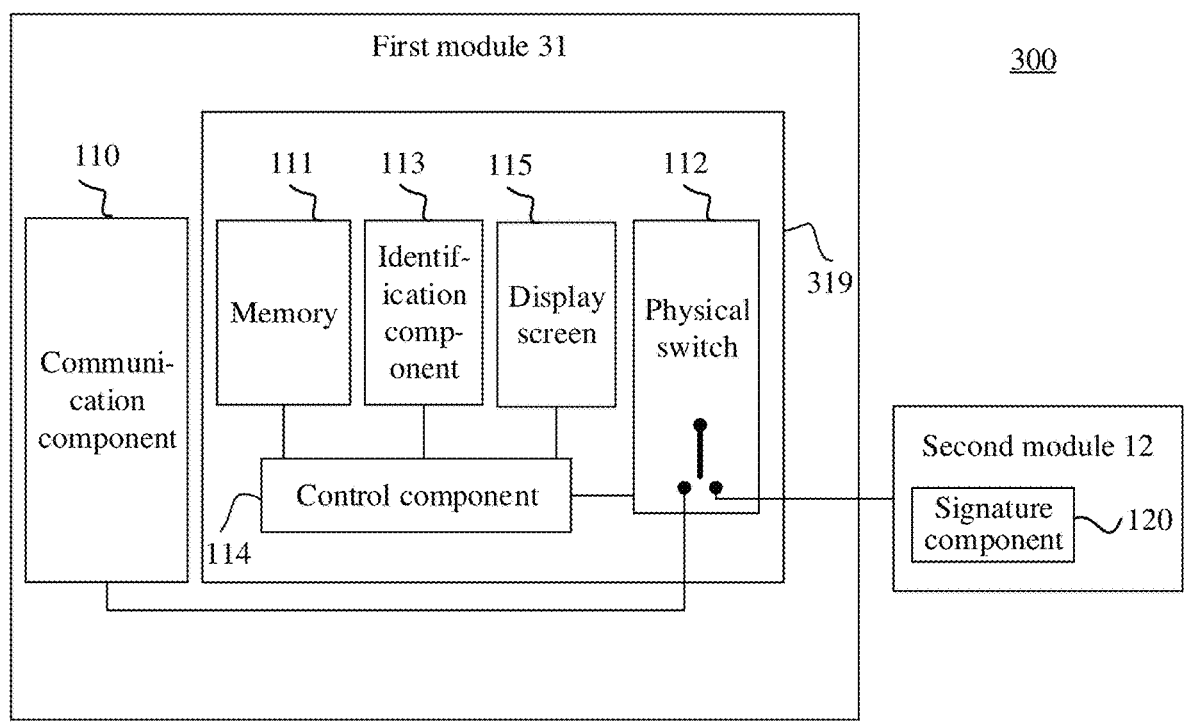
FIG. 3 is a schematic structural diagram of a third example of the digital signature terminal according to the first embodiment in the present disclosure.

FIG. 3 is a schematic structural diagram of a third example of the digital signature terminal according to the first embodiment in the present disclosure. In FIG. 3, the components with the same reference numerals as those in FIG. 2 have the same functions as those in FIG. 2, which will not be repeated here.

As shown in FIG. 3, compared with the second example, the central unit 319 further includes a display screen 115.

The display screen 115 displays the data stored in the memory for the user to check. The user instructs the signature component 120 to generate a digital signature based on the result of the check. If the check is not passed, the user instructs the second module to terminate the processing. If the check is passed, the user instructs the signature component 120 to generate the digital signature.

In a case where the display screen 115 is a touch screen, the user's instruction may be received through a graphic button on the touch screen. For example, if the check is not passed, the user instructs to terminate the processing by clicking a button which is arranged on the touch screen and used to terminate the processing. If the check is passed, the user instructs to generate the digital signature by clicking a button which is arranged on the touch screen and used to generate a digital signature.

Alternatively, a physical button may be provided on the first module 31 to receive the user's instruction. For example, if the check is not passed, the user instructs to terminate the processing by operating the physical button which is provided on the first module and is used to terminate the processing. If the check is passed, the user instructs to generate the digital signature by operating the physical button which is provided on the first module and is used to generate a digital signature.

Alternatively, if the check is not passed, the user instructs to terminate the processing by clicking the button which is arranged on the touch screen and used to terminate the processing. If the check is passed, the user instructs to generate the digital signature by operating the physical button which is provided on the first module and is used to generate a digital signature.

Alternatively, if the check is not passed, the user may perform no operation, and the terminal 300 automatically terminates the processing after a predetermined time period.

In addition, in this example, the display screen 115 is also used as a prompter to inform the user that the data is received by the first module and that the second module completes the operation, and present an identification result. When the first module 310 receives data, the display screen displays a prompt such as "data received" to prompt the user to perform an operation. When the second module 12 completes the operation, the display screen displays a prompt such as "signature completed" to prompt the user to perform an operation to disconnect the first module 31 from the second module 12. When the identification component 113 identifies the user successfully, the display screen displays a prompt such as "Succeed, please turn on the physical switch". When the identification component 113 fails to identify the user, the display screen displays a prompt such as "Unregistered user, please re-identify".

Alternatively, a separate prompter may be provided in the first module 31 to present the prompts.

As shown in FIG. 3, the control component 114 is configured to control the memory 111, the identification component 113, the display screen 115, and the physical switch 112.

In the third example, the digital signature terminal 300 performs the following steps (i) to (ix).

In step (i), the communication component 110 receives data and stores the data in the memory 111.

In step (ii), the display screen 115 presents a text prompt to inform the user that the data is received and prompt the user to perform an operation.

In step (iii), the identification component 113 performs identification on the user, and the display screen 115 displays the identification result. If the identification is unsuccessful, the display screen displays "Unregistered user, please re-identify" to prompt the user to re-identify.

The processing is terminated when the number of unsuccessful identifications reaches a predetermined number. If the identification is successful, the display screen displays "Succeed, please turn on the physical switch" to prompt the user to turn on the physical switch 112.

In step (iv), in a case that the user is identified successfully, the user turns on the physical switch 112 to simultaneously connect the central unit 319 to the second module 12 and disconnect the central unit 319 from the communication component 110.

In step (v), after the physical switch 112 is turned on, the display screen 115 displays data for the user to check. If the check is passed, the user instructs the signature component 120 to perform the digital signature operation, by pressing a physical button or a graphic button. If the check is not passed, the user instructs to terminate the processing by pressing another physical button or graphic button, or the user does not perform any operation, in which case the terminal 300 automatically terminates the processing after a predetermined time period.

In step (vi), if the check is passed, the signature component 120 generates a digital signature for the data, and stores the digital signature in the memory 111.

In step (vii), the display screen 115 presents a text prompt to prompt the user to perform an operation.

In step (viii), the user turns off the physical switch 112 to simultaneously disconnect the central unit 319 from the second module 12 and connect the central unit 319 with the communication component 110.

In step (ix), the communication component 110 sends the data attached with the digital signature.

In the third example described above with reference to FIG. 3, the control component 114 performs control on the memory 111, the physical switch 112, the identification component 113, and the display screen 115, to permit or prohibit the central unit 319 being simultaneously connected to the second module 12 and disconnected from the communication component 110 based on the identification result from the identification component 113, and permit or prohibit the digital signature operation based on the result of checking the data displayed on the display screen. Alternatively, the control component 114 may perform control to permit or prohibit the central unit 319 being simultaneously connected to the second module 12 and disconnected from the communication component 110 based on the result of checking the data displayed on the display screen, and permit or prohibit the digital signature operation based on the identification result from the identification component 113.

Figure 4:
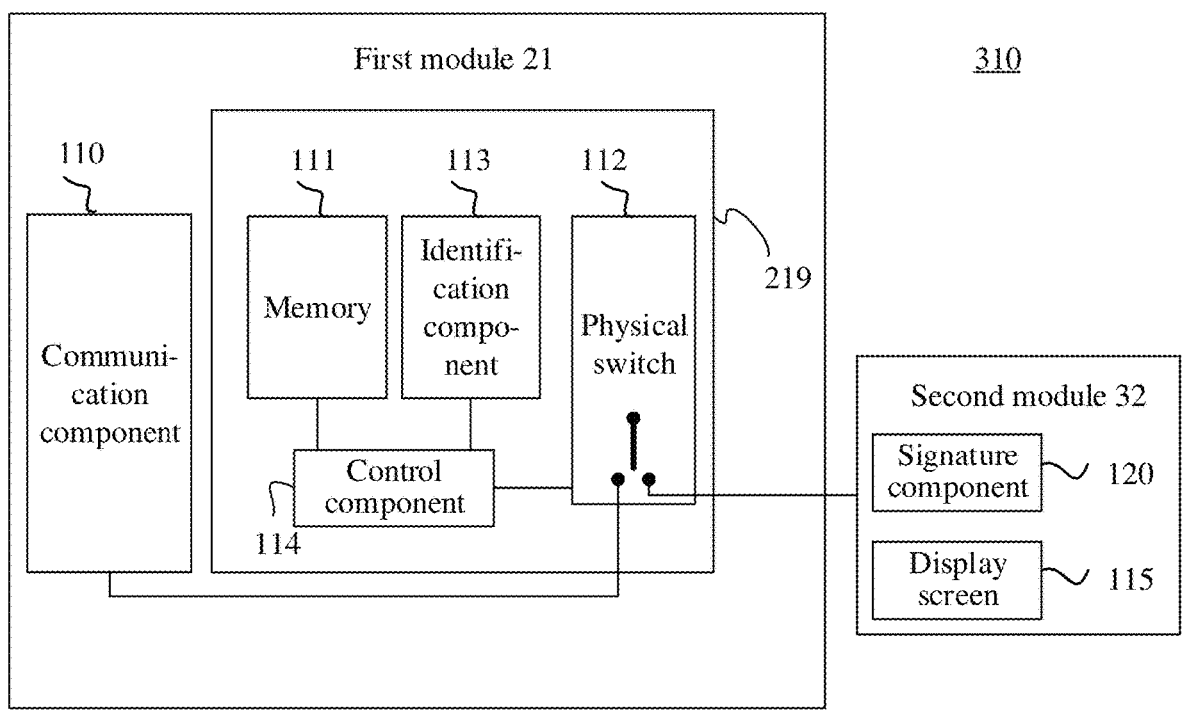
FIG. 4 shows another configuration of the third example of the digital signature terminal.

In the example of FIG. 3, the display screen 115 is provided in the first module 31. Alternatively, the display screen 115 may be provided in the second module 12, as shown in FIG. 4. The operation of the digital signature terminal 310 in FIG. 4 is like the above, and will not be described in detail here.

Furthermore, data may be maliciously tampered with in transmission. In order to ensure that the received data is consistent with the sent data, the data may be digitally signed and sent by the sending side. In this case, the digital signature terminal may receive the data attached with the digital signature. Therefore, it is necessary to verify the data attached with the digital signature. In view of this, preferably the digital signature terminal 300 may include a verification component for verifying the received data attached with a digital signature.

Example 4

Figure 5:
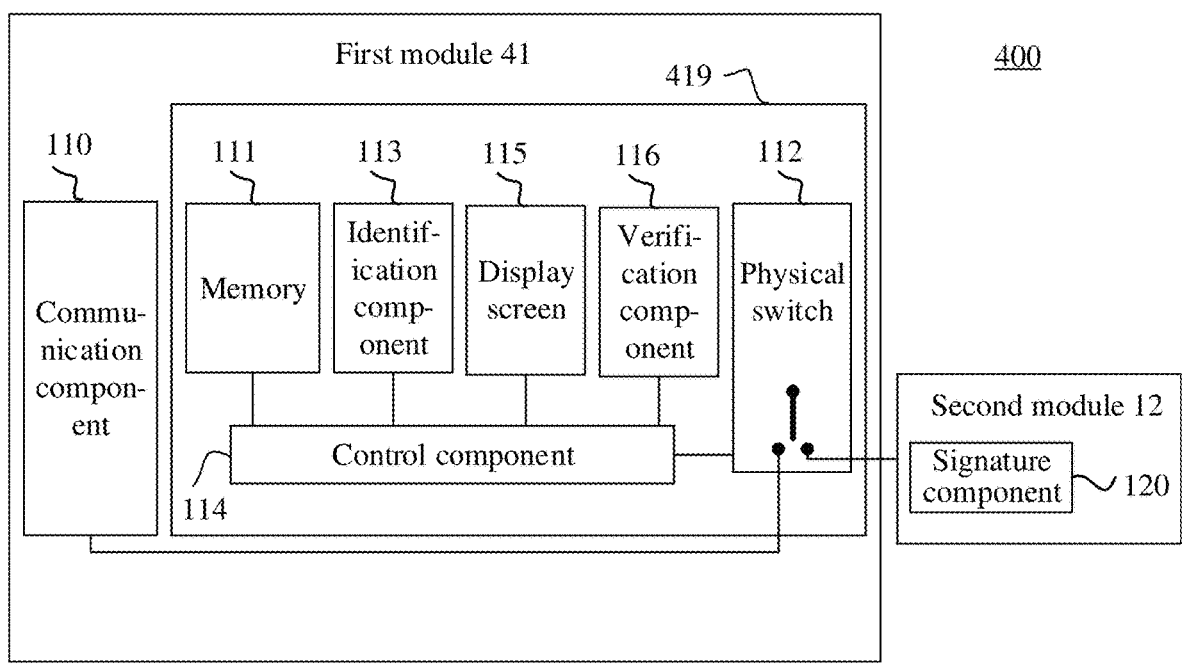
FIG. 5 is a schematic structural diagram of a fourth example of the digital signature terminal according to the first embodiment in the present disclosure.

FIG. 5 is a schematic structural diagram of a fourth example of the digital signature terminal according to the first embodiment in the present disclosure. In FIG. 5, the components with the same reference numerals as those in FIG. 3 have the same functions as those in FIG. 3, which will not be repeated here. As shown in FIG. 5, in addition to the memory 111, the identification component 113, the display screen 115, the physical switch 112 and the control component 114, the central unit 419 further includes a verification component 116.

The verification component 116 verifies the data attached with the digital signature and received by the first module, and terminates the processing of the digital signature terminal 400 if the verification is unsuccessful.

For example, the digital signature terminal 400 receives data from the cloud. In order to ensure that the data is not tampered with, the cloud uses a cloud signature private key to generate the digital signature m1 for the data M, and sends the data attached with the digital signature (M, m1) to the digital signature terminal 400. In this case, the digital terminal 400 performs the following steps (i) to (x).

In step (i), the communication component 110 receives data attached with the digital signature (M, m1) and stores the data attached with the digital signature (M, m1) in the memory 111.

In step (ii), the display screen 115 presents a text prompt to inform the user that the data is received and prompt the user to perform an operation.

In step (iii), the identification component 113 performs identification on the user, and the display screen 115 displays the identification result. If the identification is unsuccessful, the display screen displays "Unregistered user, please re-identify" to prompt the user to re-identify. The processing is terminated when the number of unsuccessful identifications reaches the predetermined number. If the identification is successful, the display screen displays "Succeed, please turn on the physical switch" to prompt the user to turn on the physical switch 112.

In step (iv), the user turns on the physical switch 112 to simultaneously connect the central unit 419 to the second module 12 and disconnect the central unit 419 from the communication component 110.

In step (v), the verification component 116 uses the cloud signature public key to verify the data attached with the digital signature (M, m1). Specifically, the cloud signature public key is used to perform a signature verification operation on m1 to obtain M1. If M is consistent with M1, the verification is successful. Otherwise, the verification is unsuccessful, and the processing of the terminal 400 is terminated.

In step (vi), if the verification is successful, the display screen 115 displays data for the user to check. If the check is passed, the user instructs the second module 12 to perform the digital signature operation, by pressing a physical button or a graphic button. If the check is not passed, the user instructs to terminate the processing by pressing another physical button or graphic button, or the user does not perform any operation, in which case the terminal 400 automatically terminates the processing after a predetermined time period.

In step (vii), the signature component 120 generates a digital signature m2 for the data M by using a terminal signature private key, and stores the digital signature in the memory 111.

In step (viii), the display screen 115 presents a text prompt to prompt the user to perform an operation.

In step (ix), the user turns off the physical switch 112 to simultaneously disconnect the central unit 419 from the second module 12 and connect the central unit 419 to the communication component 110.

In step (x), the communication component 110 sends the data attached with the digital signature (M, m2).

In the fourth example described above with reference to FIG. 5, the control component 114 performs control on the memory 111, the physical switch 112, the identification component 113, the display screen 115, and the verification component 116, to permit or prohibit the central unit 419 being simultaneously connected to the second module 12 and disconnected from the communication component 110 based on the identification result from the identification component 113, then verify the data attached with the digital signature, and then permit or prohibit the digital signature operation based on the result of checking the data displayed on the display screen. The above sequence of the identification, verification, and check is only exemplary. Alternatively, the control component 114 may perform control to verify the data attached with the digital signature first, and if the verification is successful, permit or prohibit the central unit 419 being simultaneously connected to the second module 12 and disconnected from the communication component 110 based on the identification result from the identification component 113, and then permit or prohibit the digital signature operation based on the result of checking the data displayed on the display screen.

Alternatively, the control component 114 may perform control to first verify the data attached with the digital signature. If the verification is successful, permit or prohibit the central unit 319 being simultaneously connected to the second module 12 and disconnected from the communication component 110 based on the result of checking the data displayed on the display screen, and then permit or prohibit the digital signature operation based on the identification result from the identification component 113.

Figure 6:
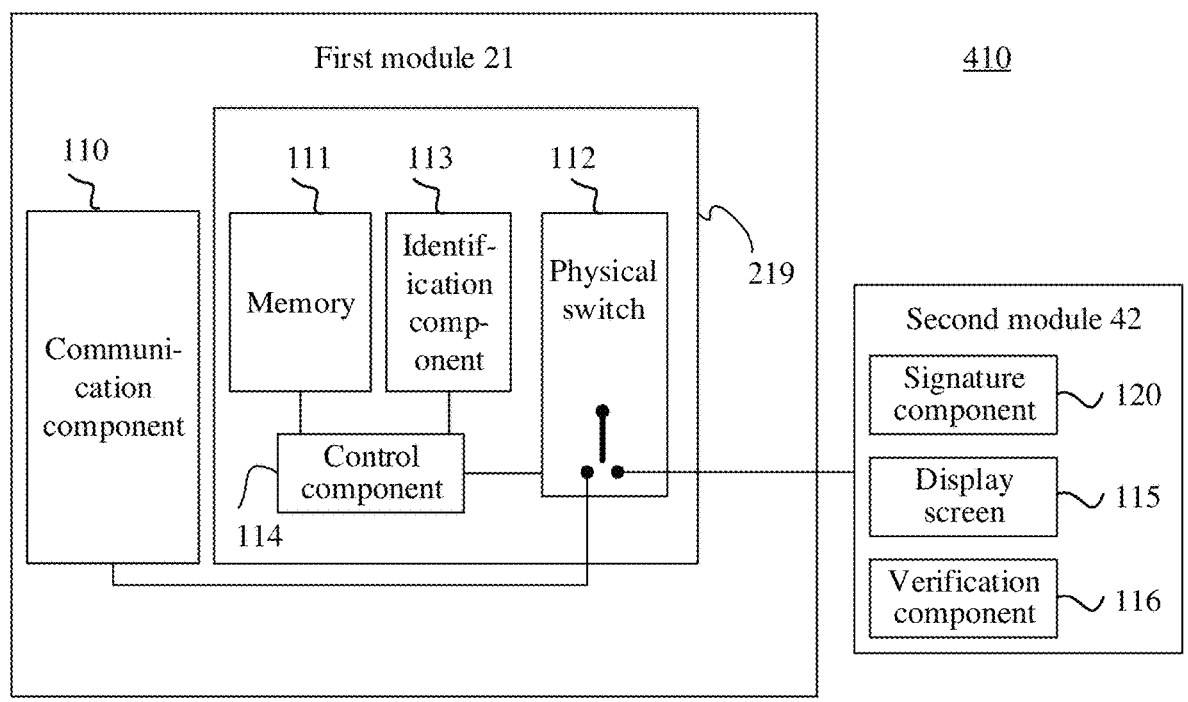
FIG. 6 shows another configuration of the fourth example of the digital signature terminal.

In this example, the display screen 115 and the verification component 116 are provided in the first module 41. Alternatively, the display screen 115 and/or the verification component 116 may be provided in the second module 12, as shown in FIG. 6. The operation of the digital signature terminal shown in FIG. 6 is like the above, and will not be repeated here.

Furthermore, some data may be confidential. In order to prevent an unauthorized third party from intercepting the data in the data transmission, the data may be encrypted and sent by the sending side. In this case, the digital signature terminal receives the encrypted data. Therefore, it is necessary to decrypt the encrypted data in order to perform the digital signature operation. In view of this, preferably the digital signature terminal 400 may further include a decryption component for decrypting the encrypted data received by the first module.

Example 5

Figure 7:
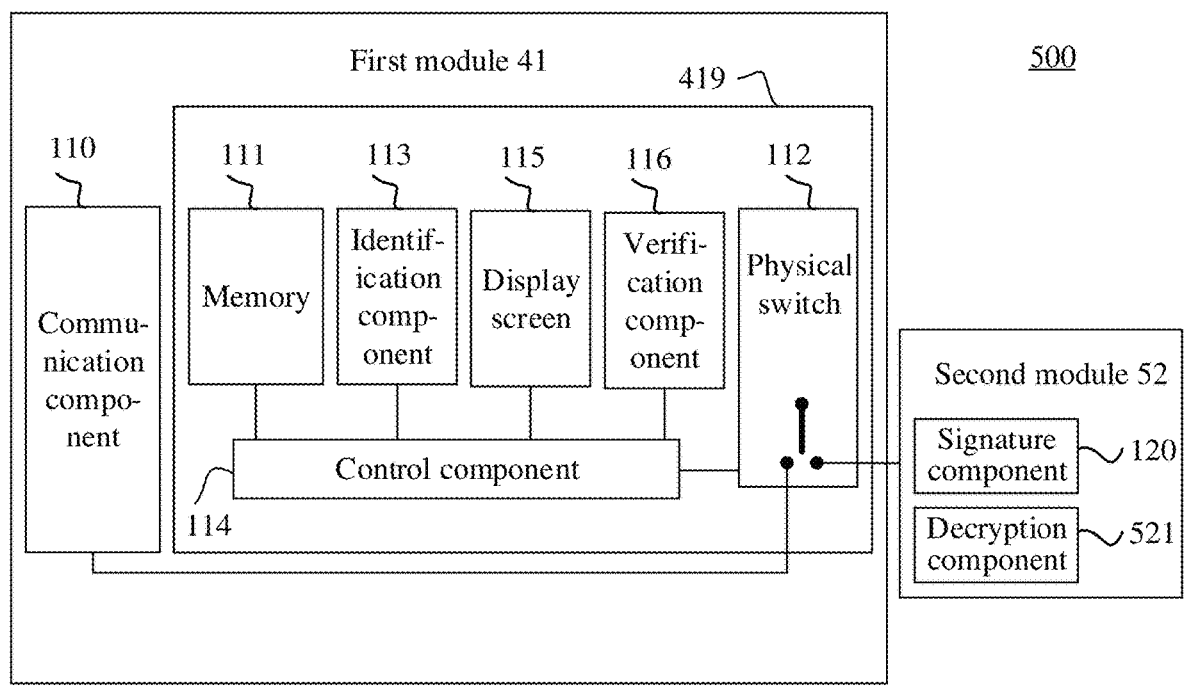
FIG. 7 is a schematic structural diagram of a fifth example of the digital signature terminal according to the first embodiment in the present disclosure.

FIG. 7 is a schematic structural diagram of a fifth example of the digital signature terminal according to the first embodiment in the present disclosure. In FIG. 7, the components with the same reference numerals as those in FIG. 5 have the same functions as those in FIG. 5, which will not be repeated here. Different from FIG. 5, the second module 52 in FIG. 7 includes a decryption component 521.

The decryption component 521 is configured to decrypt the encrypted data received by the communication component 110, and terminate the processing of the digital signature terminal 500 when the decryption is unsuccessful.

The operations of the digital signature terminal 500 in two cases are described below.

In a first case, the first module 41 receives data attached with a digital signature, where the data attached with the digital signature is encrypted.

For example, the digital signature terminal 500 receives data from the cloud. The cloud uses a cloud signature private key to generate a digital signature m1 for the data M, and uses a terminal encryption public key to encrypt the data attached with the digital signature (M, m1) to obtain encrypted data (or ciphertext) $N_{(M, m1)}$. Then the encrypted data $N_{(M, m1)}$ is sent to the digital signature terminal 500. In this case, the digital signature terminal 500 performs the following steps (i) to (xi) under the control of the control component 114.

In step (i), the communication component 110 receives the encrypted data $N_{(M, m1)}$ and stores the encrypted data $N_{(M, m1)}$ in the memory 111.

In step (ii), the display screen 115 presents a text prompt to inform the user that the data is received and prompt the user to perform an operation.

In step (iii), the identification component 113 performs identification on the user, and the display screen 115 displays the identification result. If the identification is unsuccessful, the display screen displays "Unregistered user, please re-identify" to prompt the user to re-identify. The processing is terminated when the number of unsuccessful identifications reaches the predetermined number. If the identification is successful, the display screen displays "Succeed, please turn on the physical switch" to prompt the user to turn on the physical switch 112.

In step (iv), if the identification is successful, the user turns on the physical switch 112 to simultaneously connect the central unit 419 to the second module 52 and disconnect the central unit 419 from the communication component 110.

In step (v), the decryption component 521 decrypts the encrypted data $N_{(M, m1)}$ using a terminal decryption private key, to obtain the data attached with the digital signature (M, m1). Preferably, the terminal decryption private key is stored in a second secure element in the second module 52. The second secure element is different from the first secure element that stores the terminal signature private key.

In step (vi), the verification component 116 uses a cloud signature public key to verify the data attached with the digital signature (M, m1). Specifically, the cloud signature public key is used to perform a signature verification operation on m1 to obtain M1. If M is consistent with M1, the verification is successful. Otherwise, the verification is unsuccessful, and the processing of the terminal 500 is terminated.

In step (vii), if the verification is successful, the display screen 115 displays data for the user to check. If the check is passed, the user instructs the signature component 120 to perform the digital signature operation, by pressing a physical button or a graphic button. If the check is not passed, the user instructs to terminate the processing by pressing another physical button or graphic button, or the user does not perform any operation, in which case the terminal 500 automatically terminates the processing after a predetermined time period.

In step (viii), the signature component 120 generates a digital signature m2 for the data M by using a terminal signature private key, and stores the digital signature m2 in the memory 111.

In step (ix), the display screen 115 presents a text prompt to prompt the user to perform an operation.

In step (x), the user turns off the physical switch 112 to simultaneously disconnect the central unit 419 from the second module 52 and connect the central unit 419 to the communication component 110.

In step (xi), the communication component 110 sends the data attached with the digital signature (M, m2).

In a second case, the first module 41 receives data attached with a digital signature, where the data is encrypted.

For example, the digital signature terminal 500 receives data from the cloud. The cloud uses the terminal encryption public key to encrypt the data M to obtain the encrypted data (or ciphertext) $K_M$. Then the cloud uses the cloud signature private key to generate a digital signature k for the data $K_M$, and sends the encrypted data with the digital signature ($K_M$, k) to the digital signature terminal 500. In this case, the digital terminal 500 performs the following steps (i) to (xi) under the control of the control component 114.

In step (i), the communication component 110 receives the encrypted data attached with the digital signature.

In step (ii), the display screen 115 presents a text prompt to inform the user that the data is received and prompt the user to perform an operation.

In step (iii), the identification component 113 performs identification on the user, and the display screen 115 displays the identification result. If the identification is unsuccessful, the display screen displays "Unregistered user, please re-identify" to prompt the user to re-identify. The processing is terminated when the number of unsuccessful identifications reaches the predetermined number. If the identification is successful, the display screen displays "Succeed, please turn on the physical switch" to prompt the user to turn on the physical switch 112.

In step (iv), if the identification is successful, the user turns on the physical switch 112 to simultaneously connect the central unit 419 to the second module 52 and disconnect the central unit 419 from the communication component 110.

In step (v), after the first module 41 is connected to the second module 52, the verification component 116 uses the cloud signature public key to verify the encrypted data attached with the digital signature ($K_M$, k). Specifically, the cloud signature public key is used to perform a signature verification operation on k to obtain $K_M1$. If $K_M$ is consistent with $K_M1$, the verification is successful. Otherwise, the verification is unsuccessful, and the processing of the terminal 500 is terminated.

In step (vi), if the verification is successful, the decryption component 521 decrypts the encrypted data $K_M$ using the terminal decryption private key, to obtain the data M. Preferably, the terminal decryption private key is stored in the second secure element in the second module 52.

In step (vii), the display screen 115 displays the data M for the user to check. If the check is passed, the user instructs the signature component 120 to perform the digital signature operation, by pressing a physical button or a graphic button. If the check is not passed, the user instructs to terminate the processing by pressing another physical button or graphic button, or the user does not perform any operation, in which case the terminal 400 automatically terminates the processing after a predetermined time period.

In step (viii), the second module 52 generates a digital signature m2 for the data M by using the terminal signature private key, and stores the digital signature in the memory 111.

In step (ix), the display screen 115 presents a text prompt to prompt the user to perform an operation.

In step (x), the user turns off the physical switch 112 to simultaneously disconnect the central unit 419 from the second module 52 and connect the central unit 419 to the communication component 110.

In step (xi), the communication component 110 sends the data attached with the digital signature (M, m2).

In the second case described above, the control component 114 performs control on the memory 111, the physical switch 112, the identification component 113, the display screen 115 and the verification component 116, to first permit or prohibit the central unit 419 being simultaneously connected to the second module 52 and disconnected from the communication component 110 based on the identification result from the identification component 113, then verify the encrypted data attached with the digital signature, then decrypt the verified encrypted data by the decryption component 521, and then permit or prohibit the digital signature operation based on the result of checking the data displayed on the display screen. The above sequence of the identification, verification, decryption, and check is only exemplary. Alternatively, the control component 114 may perform control to first verify the encrypted data attached with the digital signature ($K_M$, k), and after the verification is successful, permit or prohibit the central unit 419 being simultaneously connected to the second module 12 and disconnected from the communication component 110 based on the identification result from the identification component 113, then decrypt the verified encrypted data $K_M$ to obtain the data M, and then permit or prohibit the digital signature operation based on the result of checking the data M displayed on the display screen.

In this example, the display screen and the verification component are provided in the first module 41. Alternatively, the display screen 115 and/or the verification component 116 may be provided in the second module 52.

In addition, in order to ensure the secure transmission of the data signed by the second module, the digital signature terminal may encrypt the signed data before transmission. In view of this, preferably the digital signature terminal 500 may further include an encryption component for encrypting the data attached with the digital signature.

Example 6

Figure 8:
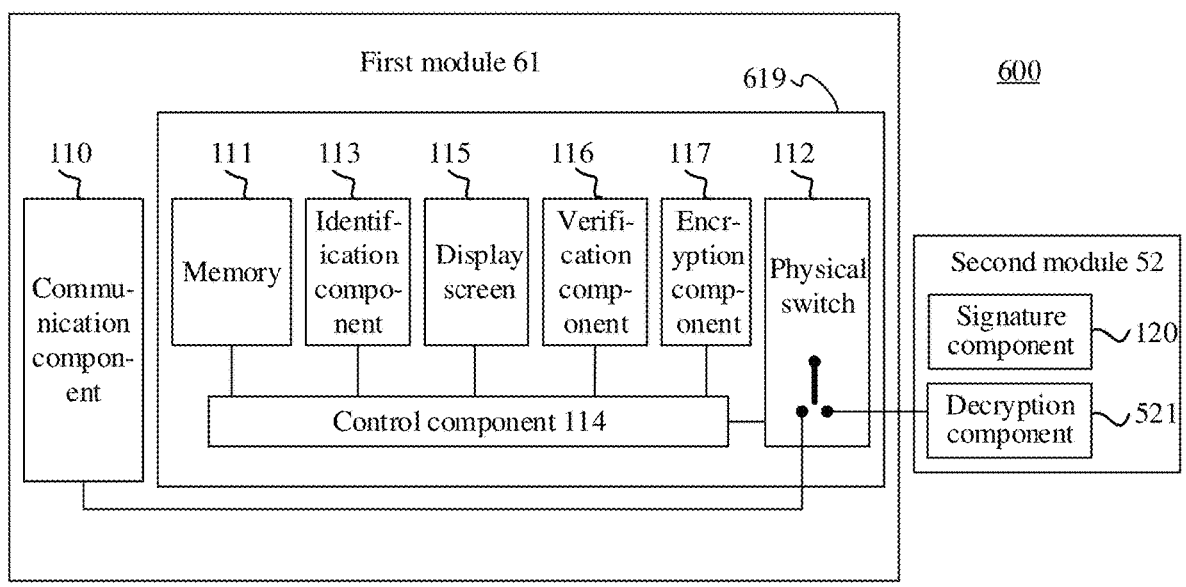
FIG. 8 is a schematic structural diagram of a sixth example of the digital signature terminal according to the first embodiment in the present disclosure.

FIG. 8 is a schematic structural diagram of a sixth example of the digital signature terminal according to the first embodiment in the present disclosure. In FIG. 8, the components with the same reference numerals as those in FIG. 7 have the same functions as those in FIG. 7, which will not be repeated here. Different from FIG. 7, the central unit 61 in FIG. 8 further includes an encryption component 117 for performing encryption operations.

The encryption component 117 performs the following encryption operations.

Right after the step that the second module 52 generates the digital signature m2 in the fifth example, the encryption component 117 encrypts the data attached with the digital signature m2, i.e., (M, m2), to obtain encrypted data $U_{(M, m2)}$. In this case, the communication component 110 sends the encrypted data $U_{(M, m2)}$ to the outside.

Alternatively, right before the step that the second module 52 generates the digital signature m2 in the fifth example, the encryption component 117 encrypts the data M to obtain the encrypted data $Q_M$. Then the signature component 120 uses the terminal signature private key to generate the digital signature q of the encrypted data $Q_M$. In this case, the communication component 110 sends the encrypted data attached with the digital signature q, i.e., ($Q_M$, q), to the outside.

Figure 9:
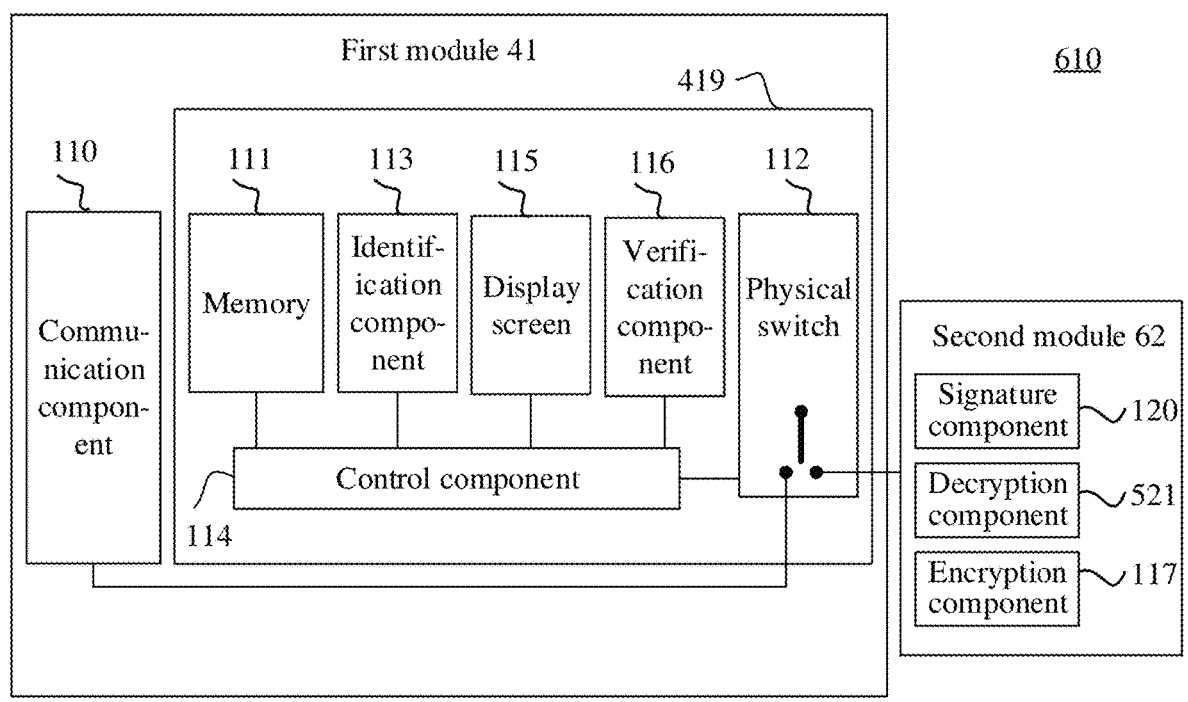
FIG. 9 shows another configuration of the sixth example of the digital signature terminal.

In this example, as shown in FIG. 8, the encryption component 117 is provided in the first module 61. Alternatively, the encryption component 117 may be provided in the second module 52, as shown in FIG. 9. The operation of the digital signature terminal 610 in FIG. 9 is like the above, and will not be repeated here.

In this example, the operations of the memory 111, the identification component 113, the display screen 115, the verification component 116, the physical switch 112, the control component 114 and the decryption component 521 are the same as those in the fifth example, and will not be repeated here.

Second Terminal Embodiment

Example 1

A digital signature terminal according to a second embodiment in the present disclosure is described below with reference to FIG. 10 and FIG. 11.

Figure 10:
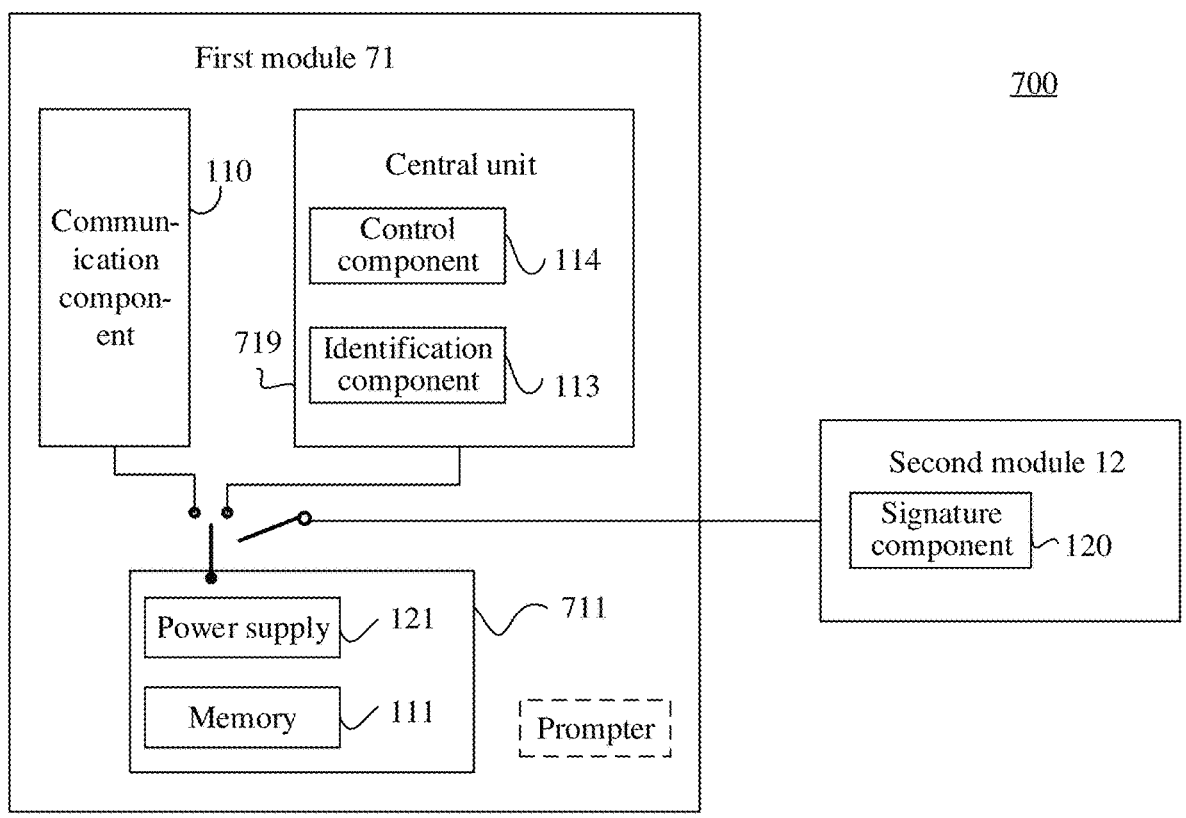
FIG. 10 is a schematic structural diagram of a first example of the digital signature terminal according to a second embodiment in the present disclosure.

FIG. 10 shows a first example of the digital signature terminal according to a second embodiment in the present disclosure. As shown in FIG. 10, the digital signature terminal 700 includes a first module 71 and a second module 12.

The first module 71 includes a communication component 110, a base unit 711, and a central unit 719. The communication component 110 is configured to communicate with the outside. The base unit 711 includes a memory 111 and a power supply 121. The memory 111 stores data received by the communication component 110. The power supply 121 supplies power to the digital signature terminal 700.

Preferably, the first module 71 may further include a prompter, such as a voice prompter, an LED indicator or a display screen, to inform the user when data is received or when the second module completes the operation, and show an identification result.

The base unit 711 receives an operation from a user, to be selectively connected to the communication component 110 or the center unit 719. Specifically, in a normal state, the base unit 711 is connected to the communication component 110. When the communication component 110 receives data and stores the data in the memory 111, the user disconnects the base unit 711 from the communication component 110 and connects the base unit 711 to the central unit 719. In addition, after the second module 12 completes the operation, the user first disconnects the second module 12 from the central unit 719, and then controls the base unit 711 to be disconnected from the central unit 719 and connected to the communication component 110.

The central unit 719 includes an identification component 113 for identifying a user's identity and a control component 114 for performing control. The central unit 719 is configured to receive an operation from the user, to be connected to or disconnected from the second module 12.

The second module 12 includes a signature component 120 for generating a digital signature for data, and the second module 12 sends the digital signature to the memory 111 for transmission by the communication component 110. The second module 12 may be fixed to the terminal 700 and connected to the central unit 719 via a physical switch such as a button or a press-key. When a signature is needed, the user turns on the physical switch. Alternatively, the second module 12 may be a detachable device, which is carried by the user. The user inserts the detachable second module 12 into the central unit 719 when needing a signature.

The firmware in the communication component 110 may be updated by a new version downloaded from the Internet, while the firmware in the central unit 719 and the second module 12 cannot be changed after leaving the factory.

In use, the digital signature terminal 700 performs the following steps (i) to (x).

In step (i), the communication component 110 receives data and stores the data in the memory 111.

In step (ii), the first module 71 controls the prompter to present a prompt such as a light, a voice, or a text, to inform the user that the data is received, and prompt the user to perform an operation.

In step (iii), the user disconnects the base unit 711 from the communication component 110, and connects the central unit 719 to the base unit 711.

In step (iv), the identification component 113 performs identification on the user, and the prompter presents the identification result. If the identification is unsuccessful, the user is notified that the identification is unsuccessful and is reminded to perform the identification again. If the number of unsuccessful identifications reaches a predetermined number of times, the processing is terminated. If the identification is successful, the user is notified that the identification is successful and is reminded to perform an operation to connect the second module 12 to the central unit 719.

In step (v), if the identification is successful, the user performs an operation such as turning on a physical switch or inserting the second module 12, to connect the central unit 719 to the second module 12.

In step (vi), the second module 12 generates a digital signature for the data, and stores the digital signature in the memory 111.

In step (vii), the first module 71 controls the prompter to present a prompt to remind the user to perform an operation.

In step (viii), the user performs an operation such as turning off the physical switch or pulling out the second module 12, to disconnect the central unit 719 from the second module 12.

In step (ix), the user disconnects the central unit 719 from the base unit 711, and connects the base unit 711 to the communication component 110.

In step (x), the communication component 110 sends the data attached with the digital signature.

Example 2

Figure 11:
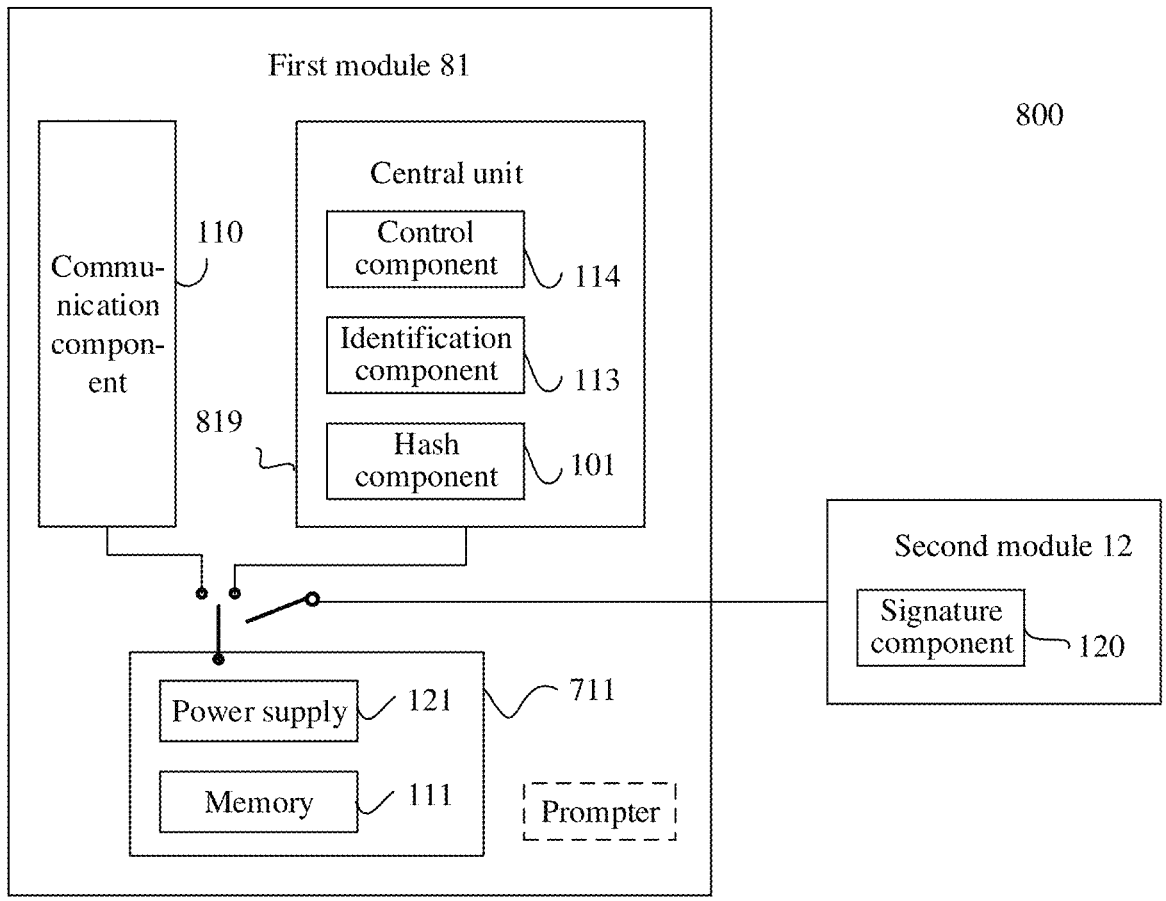
FIG. 11 is a schematic structural diagram of a second example of the digital signature terminal according to a second embodiment in the present disclosure.

FIG. 11 is a schematic structural diagram of a second example of the digital signature terminal according to the second embodiment in the present disclosure. In FIG. 11, the components with the same reference numerals as those in FIG. 10 have the same functions as those in FIG. 10, which will not be repeated here.

Compared with the digital signature terminal 700 in FIG. 10, the digital signature terminal 800 in FIG. 11 further includes a hash component 101 in the central unit 819. The hash component 101 is configured to generate a hash value for the data.

Preferably, the first module 81 may further include a prompter, such as a voice prompter, an LED indicator or a display screen, to inform the user that data is received by the communication component 110 or that the second module 12 completes the operation, and present an identification result.

In the second example, the digital signature terminal 800 performs the following steps (i) to (xi).

In step (i), the communication component 110 receives data and stores the data in the memory 111.

In step (ii), the first module 81 controls the prompter to present a prompt such as a light, a voice, or a text, to inform the user that the data is received.

In step (iii), the user disconnects the base unit 711 from the communication component 110, and connects the central unit 819 to the base unit 711.

In step (iv), the identification component 113 performs identification on the user, and the prompter presents the identification result. If the identification is unsuccessful, the user is notified that the identification is unsuccessful and is reminded to perform the identification again. If the number of unsuccessful identifications reaches a predetermined number of times, the processing is terminated. If the identification is successful, the user is notified that the identification is successful and is reminded to perform an operation to connect the second module 12 to the central unit 819.

In step (v), the user performs an operation such as turning on a physical switch or inserting the second module 12, to connect the central unit 819 to the second module 12.

In step (vi), the hash component generates a hash value for the data.

In step (vii), the second module 12 generates a digital signature for the hash value, and stores the digital signature in the memory 111.

In step (viii), the first module 81 controls the prompter to present a prompt such as a light, a voice, or a text, to prompt the user to perform an operation.

In step (ix), the user performs an operation such as turning off the physical switch or pulling out the second module 12, to disconnect the central unit 819 from the second module 12.

In step (x), the user disconnects the central unit 819 from the base unit 711, and connects the base unit 711 to the communication component 110.

In step (xi), the communication component 110 sends the hash value attached with the digital signature.

In addition, preferably the central unit 819 may further include a display screen 115. In this case, the descriptions with reference to FIG. 3 and FIG. 11 may be referred to for the details of operations of the digital signature terminal 800, which will not be repeated here.

Preferably the central unit 819 may further include a verification component 116. In this case, the descriptions with reference to FIG. 5 and FIG. 11 may be referred to for the details of operations of the digital signature terminal 800, which will not be repeated here.

Preferably the second module 12 may further include a decryption component 521. In this case, the descriptions with reference to FIG. 7 and FIG. 11 may be referred to for the details of operations of the digital signature terminal 800, which will not be repeated here.

In addition, the encryption component in the digital signature terminal described above with reference to FIG. 8 and FIG. 9 may be replaced with the hash component 101. In this case, the descriptions with reference to FIG. 11 may be referred to for the details of operations of the digital signature terminal 800, which will not be repeated here.

The above combinations of components in the digital signature terminal described with reference to FIGS. 1 to 11 is only illustrative, and those skilled in the art can make other combinations of components to achieve the effects of the present invention.

Third Terminal Embodiment

Figure 12:
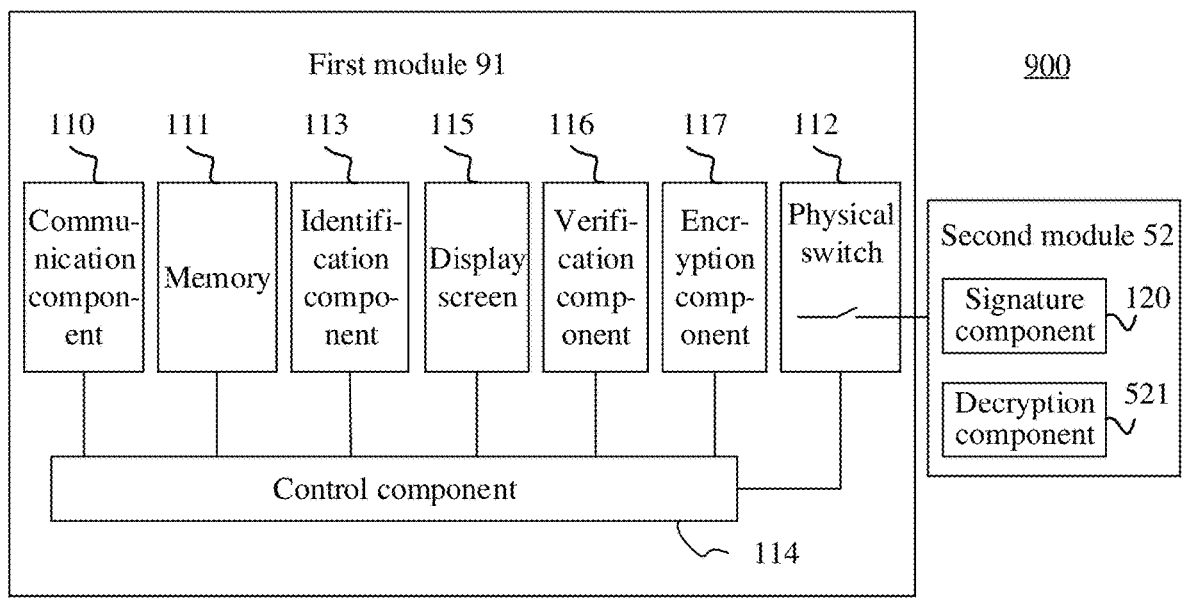
FIG. 12 is a schematic structural diagram of a digital signature terminal according to a third embodiment in the present disclosure.

In the above first embodiment in the present disclosure, the central unit receives a user's operation to be selectively connected to the communication component or the second module. Alternatively, the central unit may remain being connected to the communication part, and the first module receives the user's operation to be connected or disconnected with the second module. FIG. 12 is a schematic structural diagram of a digital signature terminal according to this embodiment. As shown in FIG. 12, the terminal 900 includes a first module 91 and a second module 52.

The first module 91 includes a communication component 110, a memory 111, a physical switch 112, an identification component 113, a control component 114, a display screen 115, a verification component 116, and an encryption component 117. The second module 52 includes a signature component 120 and a decryption component 521.

The operations of the digital signature terminal 900 are like the operations described above with reference to FIGS. 7 and 8, with the only difference that: in this embodiment, when the user turns on the physical switch 112, the digital signature terminal 900 controls to connect the first module 91 to the second module 52, and when the user turns off the physical switch 112, the digital signature terminal 900 controls to disconnect the first module 91 from the second module 52. For the operations of the digital signature terminal 900, reference may be made to the above descriptions of FIG. 7 and FIG. 8, which will not be repeated here.

In addition, the first module 91 and the second module 52 are not limited to the configuration in FIG. 12. The first module 91 may include the communication component 110, the memory 111 and the control component 114, and may further include one or more of the physical switches 112, the identification component 113, the display screen 115, the verification component 116 and the encryption component 117. The second module 52 may be configured to include the signature component 120, and may further include one or more of the display screens 115, the verification component 116, the encryption component 117 and the decryption component 521.

Hereinafter, the applications of the digital signature terminal according to FIG. 1 to FIG. 12 will be described.

Application Example 1: Payment Card

Figure 13:
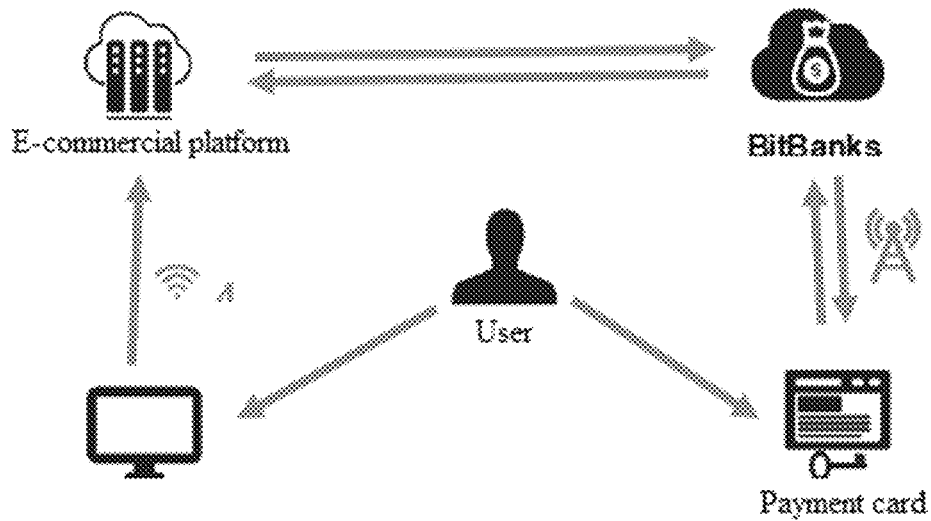
FIG. 13 is a schematic diagram showing an example in which a digital signature terminal is applied in a payment card.

FIG. 13 shows a schematic diagram of an example in which a digital signature terminal is applied to a payment card.

As shown in FIG. 13, a user purchases goods or services via an E-commercial platform by using a desktop computer or a mobile terminal. After the user places an order, the platform generates an order and presents a payment interface. On the payment interface, the user chooses to pay with a payment card and enters the ID of the payment card. Then, the platform (say, BitBanks) sends a message carrying consumption data to the payment card via its LPWAN through a network of a telecom operator.

The payment card is integrated with the digital signature terminal described above with reference to FIGS. 1 to 12. When the communication part in the payment card receives the message carrying the consumption data, the message is stored in the memory and a prompt is issued to inform the user that the data is received and prompt the user to perform an operation. Then, the user performs an operation such as operating a physical switch to control the central unit to be simultaneously connected to the second module and disconnected from the communication part. Then, the second module generates a digital signature for the message and transmits the digital signature to the memory. At this time, the prompter in the first module issues a prompt to inform the user that the signature is completed and prompt the user to perform an operation. Next, the user performs an operation such as pushing the physical switch to control the central unit to be simultaneously disconnected from the second module and connected to the communication component. As a result, the communication component sends the stored message attached with the digital signature to the server, thereby completing the payment.

In this example, the payment card is an isolated system, and payment is made only after being confirmed by operating a physical switch. Therefore, even if the mobile phone or computer has Trojan horses or other viruses, the confirmation can guarantee the displayed specific amount of money is paid to the specific merchant, thereby eliminating loopholes in the most vulnerable part of online payment.

Application Example 2: Offline Public Transportation Card that can be Automatically Recharged Commonly-used NFC cards may be classified into online cards and offline cards. In use of an online card, the corresponding POS machine or card reader should be connected to the Internet to complete the transaction. The online card only records identification information such as the card number, without any financial information such as the account balance. In use of online cards, such as deposit cards and credit cards, it is necessary to connect to the Internet to check the customer's account or account balance with the card company to complete the transaction. The online cards have advantages that the loss can be reported at any time, and recharge is not required, while they have disadvantage that it is hard to conduct transactions in areas having a poor quality of communication network or even having no communication network, and that it is usually required to perform real-name authentication.

Offline card stores the balance directly on the physical card. The account balance on the card is directly deducted (rewritten) by a POS machine or a card reader using a devaluation key, to complete the transaction. Therefore, the transaction can be completed by the POS machine or card reader without being connected to the Internet in real time. However, when the account balance is exhausted, the offline card must be recharged by a specific terminal before being used again. Furthermore, if the offline card is lost, it is difficult to report the loss. The offline cards have advantages of fast transaction and not requiring communication network for transaction.

In view of above, public transportation cards usually adopt the mode of offline card. In order to overcome the disadvantages of the offline card that it must be recharged on a specific terminal at specific location, the digital signature terminal is integrated into the public transportation cards. When the account balance in the card is less than a predetermined value, the user can perform an operation such as switching a physical switch, to control the central unit in the card to be simultaneously connected to the second module and disconnected from the communication component. Then, the second module performs a digital signature operation on a recharge message pre-written in the card. Then, the prompter informs the user that the signature is complete and prompts the user to push the physical switch to control the central unit in the card, so that it can be simultaneously disconnected from the second module and connected to the communication component. Next, the communication component sends the message attached with the digital signature to a server of the issuer of the card via the LPWAN network. Therefore, the issuer of the public transportation card can debit the recharge-amount to a debit or credit card account pre-authorized by the user. Finally, a message is sent to the public transportation card through the LPWAN network, so that the account balance on the card is rewritten.

Hereinafter, a method for secure communication according to an embodiment in the present disclosure is described with reference to FIG. 14.

First Method Embodiment

Figure 14:
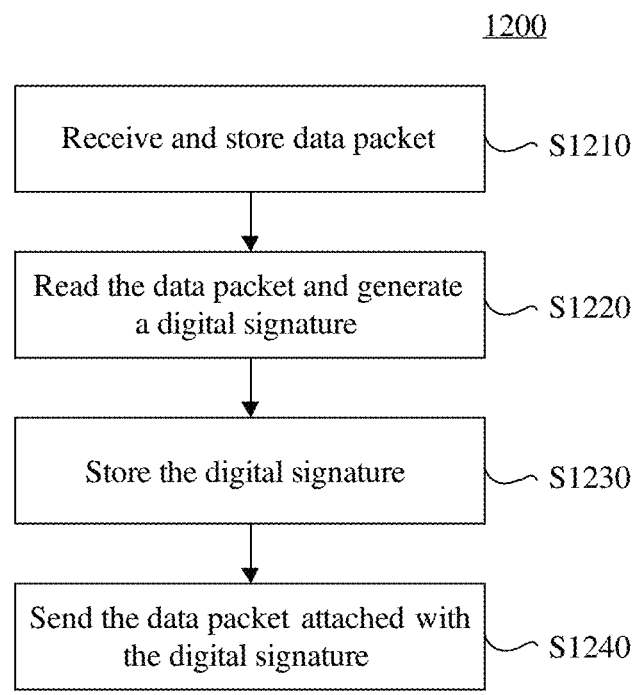
FIG. 14 is a flowchart of a secure communication method according to the first embodiment in the present disclosure.

FIG. 14 is a flowchart of a secure communication method according to the first embodiment in the present disclosure. As shown in FIG. 4, the secure communication method 1200 includes the following steps S1210 to S1240.

In step S1210, message is received and stored in the memory.

In step S1220, the message is read from the memory and a digital signature for the message is generated.

In step S1230, the digital signature is stored in the memory.

In step S1240, the digital signature and the message are acquired from the memory, and the message attached with the digital signature is sent.

In the method, no message information can be read from the memory while receiving and storing the message.

The method according to the first embodiment may be implemented by the digital signature terminal described with reference to FIG. 12, but it is not limited thereto, that is, it can be implemented by other ways readily to those skilled in the art.

In addition, in the first embodiment, preferably no message can be read from the memory while receiving and storing the message, and no received message can be stored into the memory while reading the message from the memory. No digital signature or message can be acquired from the memory while storing the digital signature into the memory, and no digital signature can be stored into the memory while acquiring the digital signature and the message from the memory. This preferred embodiment can be implemented by the digital signature terminal described with reference to FIG. 1 to FIG. 11, but it is not limited thereto, that is, it can be implemented in other ways readily to those skilled in the art.

Second Method Embodiment

In the secure communication method according to the second embodiment of the present invention, in step S1210, a message attached with a first digital signature generated using a first signature private key is received and stored in the memory. In S1220, the message attached with the first digital signature is read from the memory and verified by using a first signature public key, and a second signature private key is used to generate a second digital signature for the verified message. In step S1230, the second digital signature is stored in the memory. In step S1240, the message attached with the second digital signature is sent.

The secure communication method according to the second embodiment may be implemented by the digital signature terminals described with reference to FIG. 5 to FIG. 9 and FIG. 12, but it is not limited thereto, that is, it can be implemented in other ways readily to those skilled in the art.

Third Method Embodiment

In the secure communication method according to the third embodiment in the present disclosure, in step S1210, a first ciphertext obtained by encrypting a message attached with a first digital signature using a third encryption public key is received and stored in the memory. In step S1220, the first ciphertext is read from the memory, a third decryption private key is used to decrypt the first ciphertext, to obtain the decrypted message attached with the first digital signature, and then a first signature public key is used to verify the message attached with the first digital signature, and then a second signature private key is used to generate a second digital signature for the verified message. In step S1230, the second digital signature is stored in the memory. In step S1240, the message attached with the second digital signature is sent.

The above secure communication method according to the third embodiment may be implemented by the digital signature terminals described with reference to FIG. 7 to FIG. 9 and FIG. 12, but it is not limited thereto, that is, it can be implemented in other ways readily to those skilled in the art.

In this embodiment, the message is encrypted and decrypted by means of asymmetric encryption. Alternatively, the message may be encrypted and decrypted by means of symmetric encryption.

Fourth Method Embodiment

In the secure communication method according to the fourth embodiment of the present invention, in step S1210, a first ciphertext attached with a first digital signature generated using a first signature private key is received and stored in the memory. The first ciphertext is obtained by encrypting a message using a third encryption public key. In step S1220, the first ciphertext attached with the first digital signature is read from the memory, and a first signature public key is used to verify the first ciphertext attached with the first digital signature, and a third decryption private key is used to decrypt the verified first ciphertext to obtain the message, and a second signature private key is used to generate a second digital signature for the decrypted message. In step S1230, the second digital signature is stored in the memory. In step S1240, the message attached with the second digital signature is sent.

The above secure communication method according to the fourth embodiment may be implemented by the digital signature terminals described with reference to FIG. 7 to FIG. 9 and FIG. 12, but it is not limited thereto, that is, it can be implemented in other ways readily to those skilled in the art.

Fifth Method Embodiment

In the secure communication method according to the fifth embodiment of the present invention, in step S1210, message attached with a first digital signature generated using a first signature private key is received and stored in a memory. In step S1220, the message attached with the first digital signature is read from the memory, the message attached with the first digital signature is verified by using a first signature public key, and a second signature private key is used for generate a second digital signature for the verified message, and the message attached with the second digital signature is encrypted by using a fourth encryption public key to obtain a second ciphertext. In step S1230, the second ciphertext is stored in the memory. In step S1240, the second ciphertext is sent.

The above secure communication method according to the fifth embodiment may be implemented by the digital signature terminals described with reference to FIGS. 8, 9 and 12, but it is not limited thereto, that is, it can be implemented in other ways readily to those skilled in the art.

In the above description, preferably the algorithm for generating the first digital signature or the second digital signature is different from the algorithm used for encryption or decryption.

Furthermore, preferably the pair of the first signature public key and the first signature private key, the pair of the third encryption public key and the third decryption private key, the pair of the fourth encryption public key and the fourth decryption private key, and the pair of the second signature public key and the second signature private key are different from each other. Alternatively, the pair of the first signature public key and the first signature private key is the same as the pair of the fourth encryption public key and the fourth decryption private key, and the pair of the third encryption public key and the third decryption private key is the same as the pair of the second signature public key and the second signature private key.

The steps of the secure communication method are briefly described above with reference to FIG. 14. For the detailed operation of each step, reference may be made to the above description of FIG. 1 to FIG. 12, which will not be repeated here.

In addition, it is noted that each component of the above-mentioned system can be implemented by software, firmware, hardware, or a combination thereof, methods for which are well known to those skilled in the art, and will not be repeated here. In the case of implementation by software or firmware, the program constituting the software is installed from a storage medium or network to a computer with a dedicated hardware structure (for example, the general-purpose computer 1300 shown in FIG. 15). The computer can perform various functions when being installed with various programs.

Figure 15:
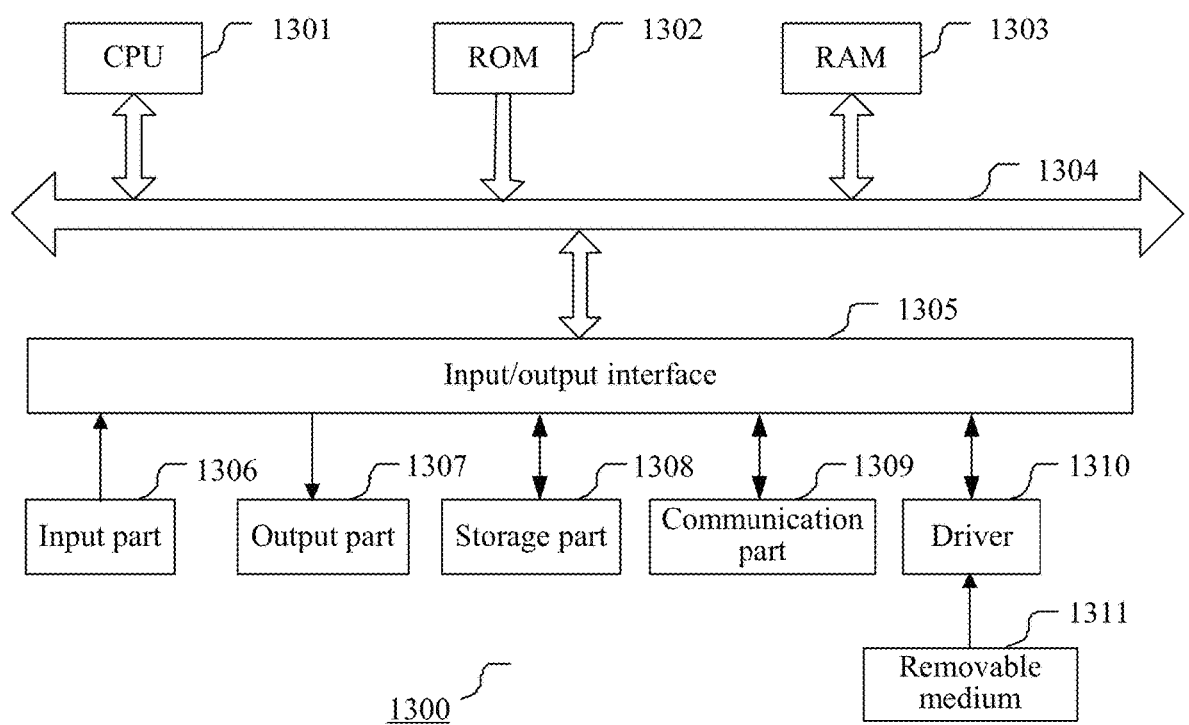
FIG. 15 is a schematic block diagram of a computer used for implementing the method and device according to embodiments in the present disclosure.

FIG. 15 shows a schematic block diagram of a computer for implementing the method and the device according to the embodiments in the present disclosure.

In FIG. 15, a central processing unit (CPU) 1301 performs various types of processing according to a program stored in a read only memory (ROM) 1302 or a program loaded from a storage part 1308 to a random-access memory (RAM) 1303. Data required by CPU 1301 for performing various types of processing is stored in the RAM 1303 as needed. The CPU 1301, the ROM 1302 and the RAM 1303 are connected to each other via a bus 1304. An input/output interface 1305 is also connected to the bus 1304.

The input/output interface 1305 relates to an input part 1306 (including a keyboard, a mouse, and the like), an output part 1307 (including a display, such as a Cathode Ray Tube (CRT) and a Liquid Crystal Display (LCD), and a loudspeaker), a storage part 1308 (including a hard disk and the like), and a communication part 1309 (including a network interface card, such as a LAN card, a modem, and the like). The communication part 1309 performs communication processing via a network such as the Internet. A driver 1310 may also relate to the input/output interface 1305 as needed. A removable medium 1311 such as a magnetic disk, an optical disk, a magneto-optical disk, and a semiconductor memory may be installed on the driver 1310 as needed, such that the computer programs read from the removable medium 1311 are installed in the storage part 1308 as needed.

In a case of performing the series of processing described above by software, programs constituting the software are installed from the network such as the Internet, or from a storage medium such as the removable medium 1311.

Those skilled in the art should understand that the storage medium is not limited to the removable medium 1311 shown in FIG. 15 that stores a program and is distributed separately from a device to provide the program to the user. The removable medium 1311 may be, for example, a magnetic disk (including a floppy disk (registered trademark)), an optical disk (including a Compact Disk Read-Only Memory (CD-ROM) and a Digital Video Disk (DVD)), a magneto-optical disk (including minidisk (MD) (registered trademark)) and a semiconductor memory. Alternatively, the storage medium may be the ROM 1302, a hard disk contained in the storage part 1308 and the like, in which programs are stored. The memory medium is distributed to a user together with the apparatus containing the memory medium.

It is further proposed a program product having machine readable instruction codes stored therein. When read and executed by a machine, the instruction codes cause the machine to perform the above-described method according to the embodiments of the present disclosure.

Accordingly, a storage medium for carrying the above-described program product storing the machine-readable instruction codes is also provided in the present disclosure. The storage medium may include, but not limited to, a floppy disk, an optical disk, a magneto-optical disk, a memory card, a memory stick, and the like.

It is noted that, the method of the present disclosure is not limited to be performed in an order described in the specification, but may be performed in other orders, in parallel or independently. Therefore, the order in which the method is performed described herein does not limit the technical scope of the present disclosure.

The above description of the various embodiments is provided for better understanding of the present invention, which is only exemplary and is not intended to limit the present invention. It is noted that in the above description of the embodiments of the present disclosure, features that are described and/or illustrated with respect to one embodiment may be used in the same way or in a similar way in one or more other embodiments, by be combined with or replace other features of the other embodiments. Those skilled in the art can understand that, without departing from the inventive concept of the present invention, various changes and modifications made to the above-described embodiments all fall within the scope of the present invention.

The invention claimed is:

1. A terminal device used for digital signature, comprising:
   a first module; and
   a second module; wherein
   the first module comprises a communication component configured to communicate with a hub,
   the first module further comprises a central unit comprising a memory configured to store message received by the communication component,
   the central unit is configured to receive an instruction from a user to be simultaneously connected to the second module and disconnected from the communication component or to be simultaneously disconnected from the second module and connected to the communication component, and
   the second module comprises a signature component configured to generate a digital signature for the message along with a separated memory storing a private signature key at a device side, and the second module is configured to send the digital signature to the memory.

2. The terminal device according to claim 1, wherein the communication component is configured to send the data attached with the digital signature to the hub.

3. The terminal device according to claim 2, wherein the central unit comprises a physical switch, and the operation from the user is performed via the physical switch.

4. The terminal device according to claim 1, wherein the central unit comprises an identification/authentication component configured to:
   perform identification on the user; and
   permit or prohibit further operation from the user according to a result of the identification/authentication.

5. The terminal device according to claim 4, wherein the identification component is configured to perform the identification/authentication on the user by a password or a biometric feature of the user.

6. The terminal device according to claim 5, wherein a password or a biometric feature stored in the identification component is set or reset after being subjected to multiple security checks by an application program run on the terminal device or an auxiliary device.

7. The terminal device according to claim 6, wherein one of the central unit and the first module comprises a display screen, the display screen is configured to display the stored message for a verification by the user, wherein the signature component is configured to generate the digital signature of the data in response to an instruction from the user based on the result of the verification.

8. The terminal device according to claim 7, wherein
the terminal device is configured to terminate a process in response to an instruction from the user if the result of the verification is negative, and the signature component is configured to generate the digital signature to an instruction from the user if the result of the verification is positive; and
the terminal is configured to terminate the process if no response after a predetermined time period.

9. The terminal device according to claim 8, wherein the display screen is a touch screen,
the terminal is configured to terminate the process by touching a specific button on the touch screen, and
the signature component is configured to generate the digital signature by pushing a physical button which is provided on one of the central unit and the second module for generating the digital signature.

10. The terminal device according to claim 1, wherein the communication component adopts one or more of the following:
Wide-Area Network (WAN) wireless communication;
short-range wireless communication such as BLE and NFC; and
wired communication.

11. A financial card, comprising the terminal device according to claim 1, wherein
the communication component is configured to receive a message carrying financial transaction data or identity verification information, and store the message into the memory;
the central unit is configured to receive the instructions from the user to be simultaneously connected to the second module and disconnected from the communication component or to be simultaneously disconnected from the second module and connected to the communication component;
after a successful visual verification by the user, the signature component is configured to generate the digital signature for the message, and send the digital signature to the memory; and
the communication component is then configured to send the stored message attached with the digital signature to perform payment or identification.

12. The financial card according to claim 11, wherein the payment message comprises information related to payment for an online merchant, which includes, but not limited to, the total amount for the online-shopping order, merchant account information, a timestamp, and the payer's account information.

13. The financial card according to claim 11, wherein the message comprises information of financial transactions, which includes, but not limited to, bank-deposit transfer, buy/sell stocks.

14. The financial card according to claim 11, wherein
the communication component adopts short-range wireless communication such as NFC to an ATM machine and is configured to send a cash-withdrawal instruction in response to an instruction from a user, and then receive the message carrying the financial data, and
the financial data comprises information related to verification for cash-withdrawal, the information comprises a withdrawal amount, a withdrawal location, withdrawal account information, and a timestamp.

15. An offline quick-payment card with quick-recharge feature, comprising the terminal device according to claim 1, wherein
the central unit is configured to receive the instruction from the user to be simultaneously connected to the second module and disconnected from the communication component,
after an instruction by the user, the signature component is configured to acquire a preset money-recharge message from the memory of the central unit, generate the digital signature for the message, and send the digital signature to the memory;
the communication component is configured to send the stored message attached with the digital signature to a server via an LPWAN network; and
the communication component is configured to receive information carrying money-recharging message from the server via the LPWAN network to recharge the offline quick-payment card.

16. A computer security enhancement device, comprising the terminal device according to claim 1, wherein the terminal device is used when the computer or a mobile equipment is login to a server account such as social media or cloud photo storage account:
i) once the server receives the login request, a message is sent to the account owner's terminal device, which is then stored into the memory of the first unit;
ii) the message is displayed on the device, after the visual verification and confirmation by the user, the message is read from the memory and a digital signature of the message is generated;
iii) the digital signature of the message is then stored into the memory; and
iv) after a switch is pushed or touched, the digital signature unit is off and the communication unit is once again on the first unit, and the digital signature in iii) is sent to the server, based on the result of signature verification to the user, the server shall grant or deny the login request.

17. A method for secure communication, comprising the following steps:
i) receiving a message and storing the message into a memory;
ii) after a visual-verification, reading the message from the memory and generating a digital signature for the message;
iii) storing the digital signature into the memory; and
iv) acquiring the digital signature and the message from the memory and sending the message attached with the digital signature;
wherein
in step i), receiving a message attached with a digital signature m1 by first private signature key at a cloud side, and storing both message and its digital signature into the memory, wherein the digital signature m1 is generated by using a first private signature key at the cloud side;
in step ii), verifying m1 by using the corresponding first signature public key at the cloud side, if successful, reading the message from the memory and displaying it on the device, after visual-verification, generating the digital signature m2 for the message by using a second signature private key at a device side;
in step iii), storing the above digital signature m2 into the memory; and
in step iv), sending the message along with the digital signature m2.

18. The method according to claim 17, wherein step ii) comprises:
  ii-a) performing identification/authentication on the user;
  ii-b) reading the message from the memory and generating the digital signature for the message when the identification/authentication is successful; and
  ii-c) terminating a process when the identification/authentication is unsuccessful.

19. The method according to claim 18, wherein step ii-b) comprises:
  ii-b-1) reading the message from the memory and displaying the message for a verification by the user;
  ii-b-2) generating the digital signature for the message when the verification is successful; and
  ii-b-3) terminating the process when the verification is unsuccessful.

20. The method according to claim 17, wherein
  in step i), receiving from cloud an encrypted message and an encrypted m1 and storing them into the memory, wherein the encryption is generated by using a third encryption public key at the device side; and
  in step ii), reading the encrypted text from the memory;
  decrypting that encrypted text by using the corresponding third encryption private key at the device side to obtain the message and the attached digital signature m1; and
  further verifying the message using the attached digital signature m1 by using the first signature public key at the cloud side.

21. The methods according to claim 20, wherein all the private-public key asymmetric encryption methods are replaced by symmetric methods with encryption keys pre-installed in both the cloud and devices.

22. The method according to claim 11, wherein
  in step i), receiving an encrypted message m0 attached with a digital signature k of the m0, and storing both m0 and k into the memory, wherein the encrypted message m0 is generated using a third encryption public key at the device side, the digital signature k of m0 is generated by using the first signature private key at the cloud side; and
  in step ii), reading both the encrypted message m0 and the attached digital signature k from the memory;
  verifying the encrypted message m0 by applying the first signature public key at the cloud side to the digital signature k;
  if the verification is successful, decrypting m0 by using a third encryption private key at the device side to obtain and display the original message; and
  generating the digital signature for the encrypted message m0 by using a second signature private key at the device side.

23. The method according to claim 11, wherein
  in step ii), further encrypting the digital signature m1 by using a fourth encryption public key at the cloud side to obtain an encrypted message m4;
  in step iii), storing the above m4 into the memory; and
  step iv), sending m4 to the hub.

* * * * *